(12) United States Patent
Totterman et al.

(10) Patent No.: US 11,878,849 B2
(45) Date of Patent: Jan. 23, 2024

(54) INJECTION MOLDED POLYMERIC BIODEGRADABLE CONTAINER

(71) Applicant: Cove, PBC, West Hollywood, CA (US)

(72) Inventors: Alex Totterman, Bath (GB); Matthew White, West Sussex (GB)

(73) Assignee: Cove, PBC, West Hollywood, CA (US)

(*) Notice: Subject to any disclaimer, the term of this patent is extended or adjusted under 35 U.S.C. 154(b) by 95 days.

(21) Appl. No.: 16/262,847

(22) Filed: Jan. 30, 2019

(65) Prior Publication Data

US 2019/0329950 A1 Oct. 31, 2019

Related U.S. Application Data

(60) Provisional application No. 62/699,532, filed on Jul. 17, 2018, provisional application No. 62/656,253, filed on Apr. 11, 2018.

(51) Int. Cl.
  *B65D 65/46* (2006.01)
  *B65D 8/00* (2006.01)
  (Continued)

(52) U.S. Cl.
  CPC ........ *B65D 65/466* (2013.01); *B29C 45/0001* (2013.01); *B29C 45/0003* (2013.01);
  (Continued)

(58) Field of Classification Search
  CPC .... B65D 11/04; B65D 11/20; B65D 2203/02; B65D 23/0842; B65D 41/325;
  (Continued)

(56) References Cited

U.S. PATENT DOCUMENTS 4,140,235 A * 2/1979 Rausing ................. B65D 39/08
  215/305
5,465,856 A 11/1995 Sheffler
  (Continued)

FOREIGN PATENT DOCUMENTS

GB 2050320 * 1/1981
JP 2007-119009 * 5/2007

OTHER PUBLICATIONS

International Search Report dated Aug. 7, 2019, for PCT Application No. PCT/US2019/027091, filed on Apr. 11, 2019, 4 pages.
(Continued)

*Primary Examiner* — Yan Lan
(74) *Attorney, Agent, or Firm* — COOLEY LLP

(57) ABSTRACT

A biodegradable container including a unitary polymeric body element having a top portion and a cylindrical body portion. The top portion has a cylindrical neck wherein the cylindrical neck defines an inner surface and an outer surface. The container further includes a polymeric bottom element welded to the cylindrical body portion of the unitary polymeric body element. A polymeric cap defines an internal rim configured to be received by the inner surface of the cylindrical neck. The polymeric cap includes an external cover having an interior surface which may be tapered so that the outer surface of the cylindrical neck and the interior surface of the external cover form an inner seal. The interior surface of the external cover may also form an outer seal with the outer surface of the cylindrical neck when the polymeric cap is in a closed position.

14 Claims, 41 Drawing Sheets

FIG. 1B

(51) Int. Cl.
  *B65D 6/00* (2006.01)
  *B65D 41/32* (2006.01)
  *B65D 41/34* (2006.01)
  *B29C 45/00* (2006.01)
  *B29C 65/06* (2006.01)
  *B65D 23/08* (2006.01)
  *B29L 31/00* (2006.01)
  *B29C 65/00* (2006.01)

(52) U.S. Cl.
  CPC .............. *B29C 65/06* (2013.01); *B65D 11/04* (2013.01); *B65D 11/20* (2013.01); *B65D 23/0842* (2013.01); *B65D 41/325* (2013.01); *B65D 41/34* (2013.01); *B29C 65/069* (2013.01); *B29C 65/0672* (2013.01); *B29C 66/5432* (2013.01); *B29C 66/73791* (2013.01); *B29L 2031/7158* (2013.01); *B65D 2203/02* (2013.01); *B65D 2401/15* (2020.05); *Y10T 428/1352* (2015.01)

(58) Field of Classification Search
  CPC ...... B65D 41/34; B65D 65/466; B65D 15/02; B65D 2101/0023; B65D 23/0857; B65D 2401/05; B65D 2401/15; B65D 41/0414; B65D 55/0818; B29C 45/0001; B29C 45/0003; B29C 65/06; B29C 65/0672; B29C 65/069; B29C 65/08; B29C 66/12441; B29C 66/12469; B29C 66/322; B29C 66/5344; B29C 66/5432; B29C 66/73791; B29C 66/73921; B29C 66/8322; B29L 2031/7158; Y10T 428/1352; Y02W 90/10
  See application file for complete search history.

(56) References Cited

U.S. PATENT DOCUMENTS

| | | | | |
|---|---|---|---|---|
| 5,904,259 | A * | 5/1999 | Hidding | B65D 41/48 215/232 |
| 6,315,140 | B1 * | 11/2001 | Nadel | B65D 51/32 215/354 |
| 7,980,403 | B2 * | 7/2011 | Martinez | B65D 39/08 215/356 |
| 2004/0016716 | A1 | 1/2004 | Melrose et al. | |
| 2007/0163213 | A1 * | 7/2007 | Till | B29C 49/20 53/471 |
| 2009/0250426 | A1 | 10/2009 | Martinez | |
| 2010/0230405 | A1 * | 9/2010 | Strait, III | B29C 66/124 220/4.01 |
| 2012/0181247 | A1 | 7/2012 | Grulke et al. | |
| 2013/0020277 | A1 | 1/2013 | Berk et al. | |
| 2014/0346071 | A1 | 11/2014 | Genosar | |
| 2016/0176103 | A1 | 6/2016 | Rousseau et al. | |
| 2021/0147130 | A1 | 5/2021 | Totterman et al. | |

OTHER PUBLICATIONS

Non-Final Office Action dated Feb. 22, 2023, for U.S. Appl. No. 17/047,039, filed Oct. 12, 2020, 13 pages.
Written Opinion of the International Searching Authority dated Aug. 7, 2019, for PCT Application No. PCT/US2019/027091, filed on Apr. 11, 2019, 8 pages.

* cited by examiner

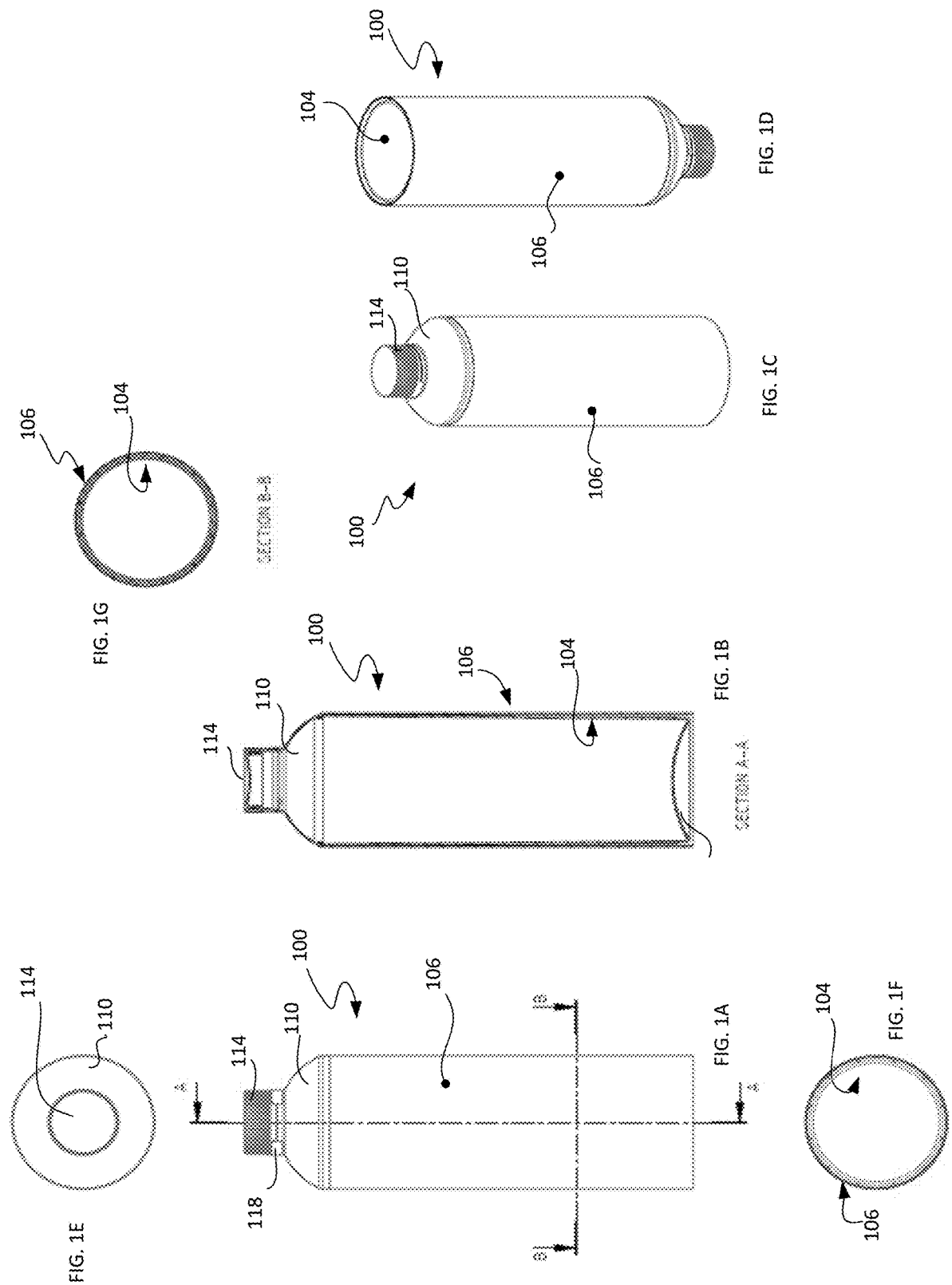

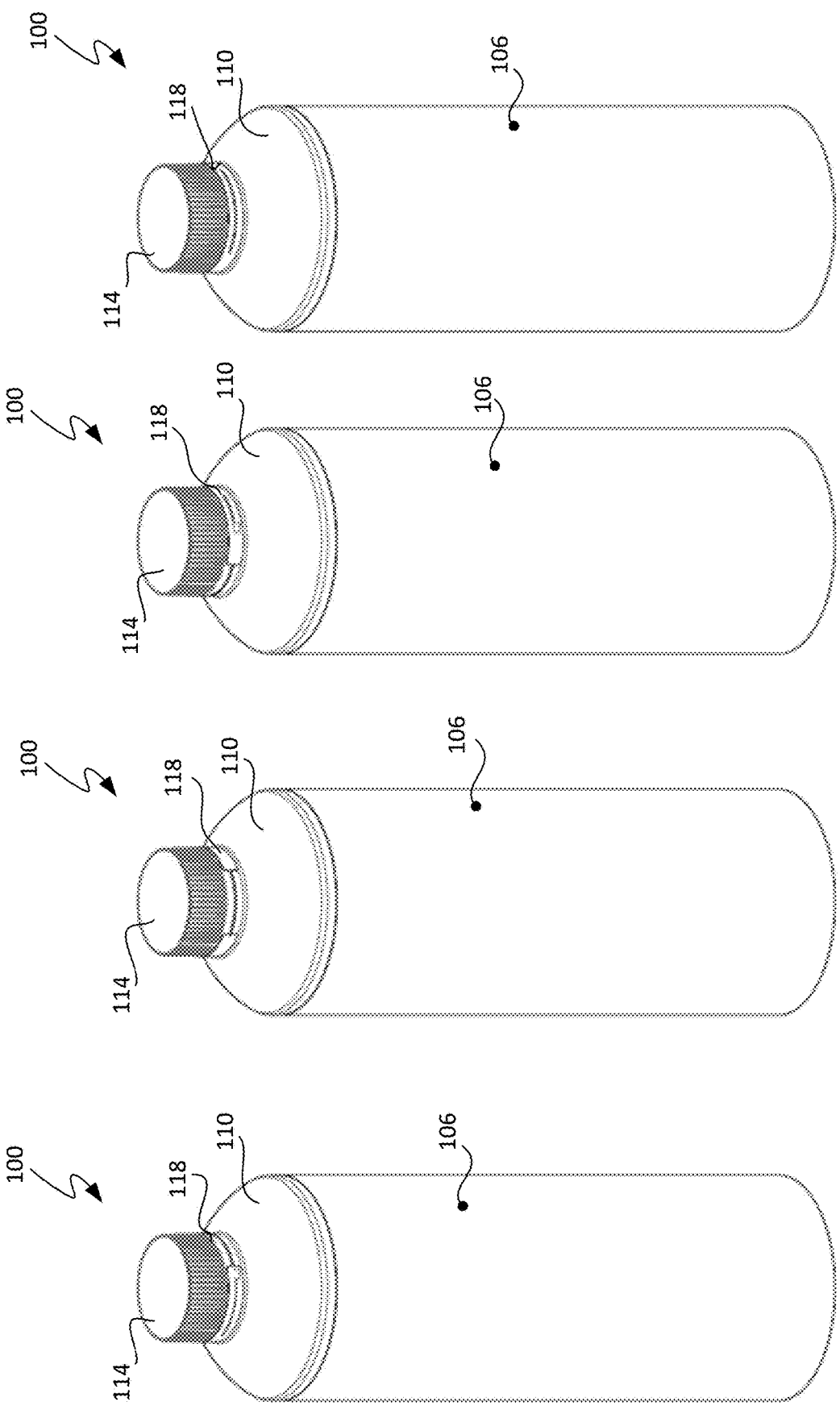

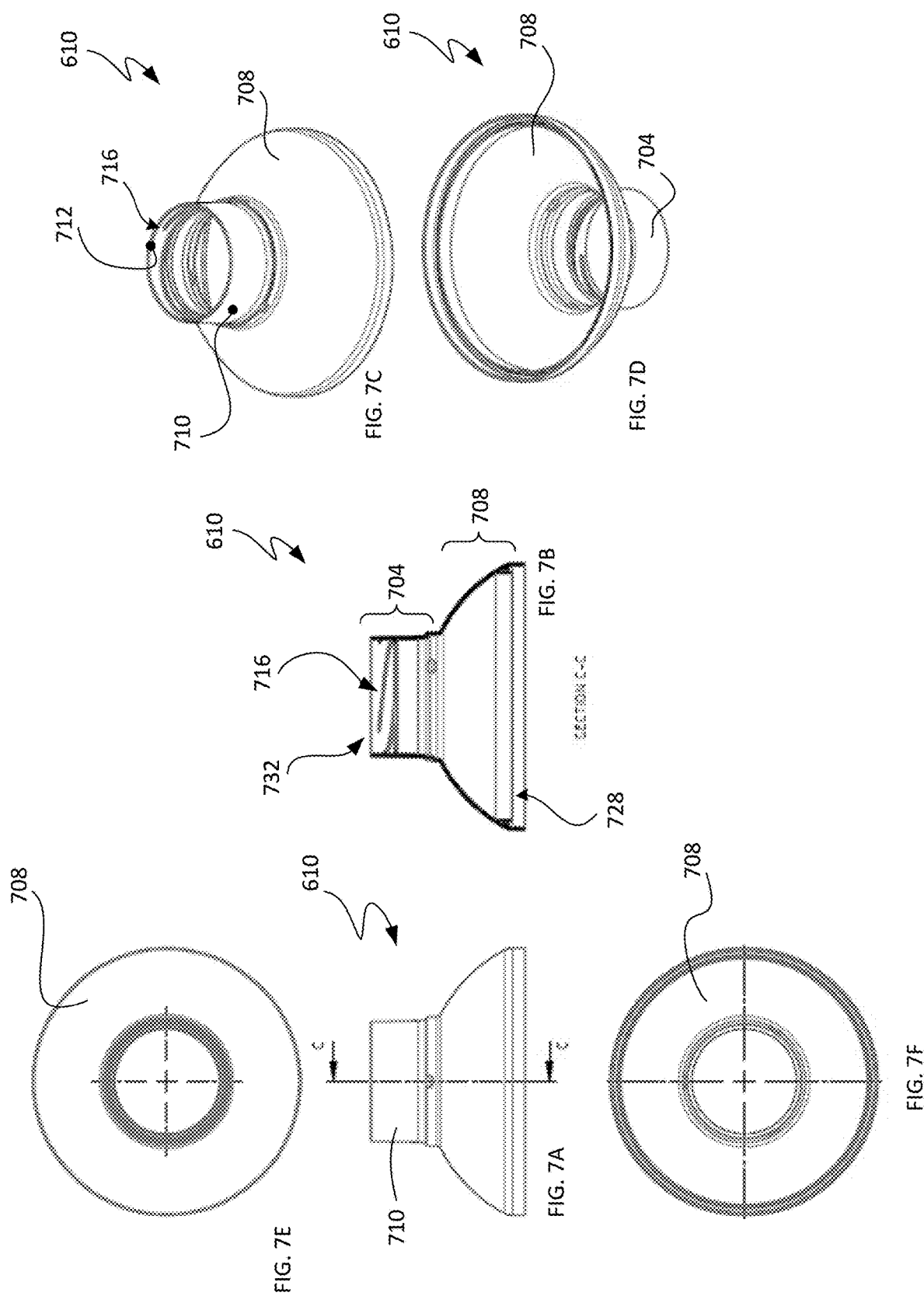

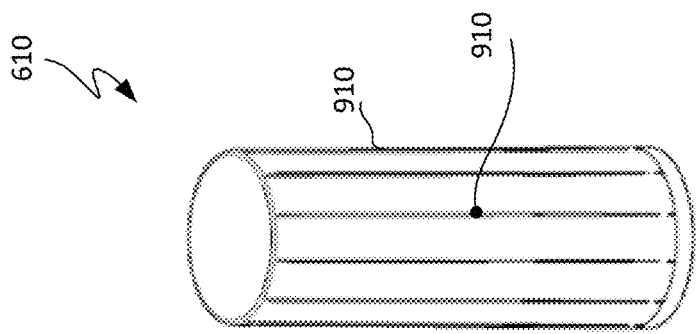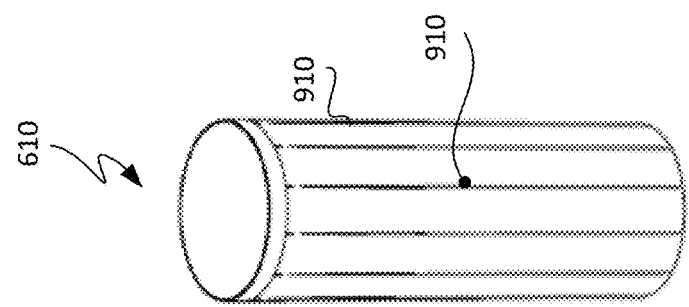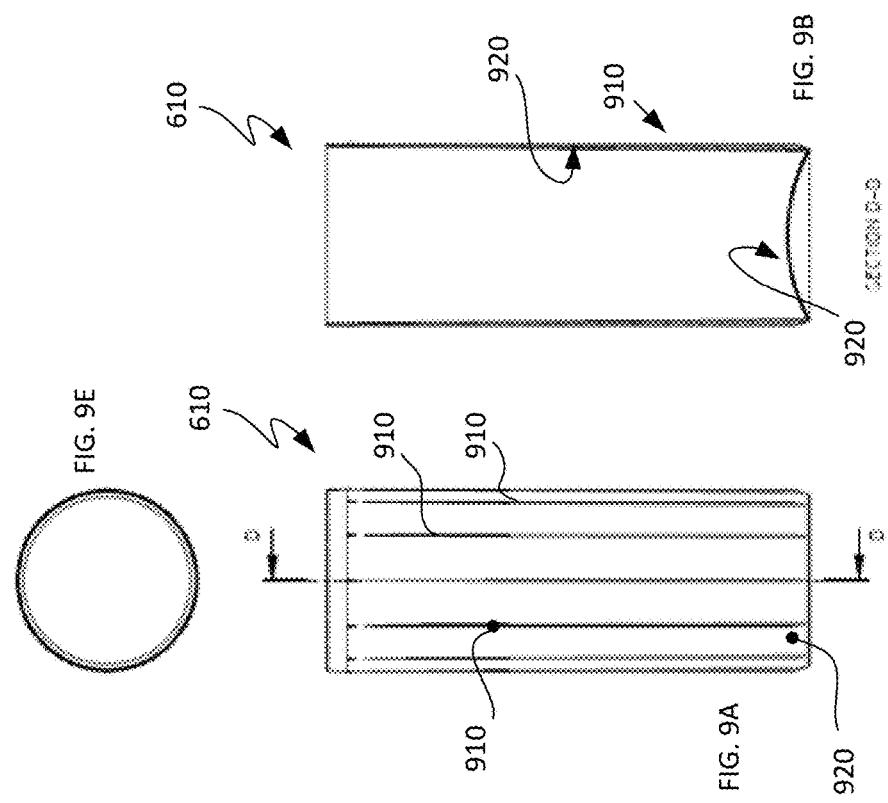

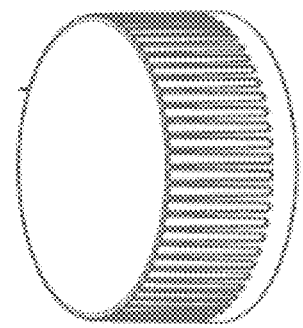
FIG. 10C
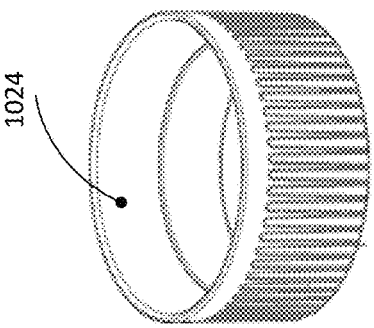
FIG. 10D
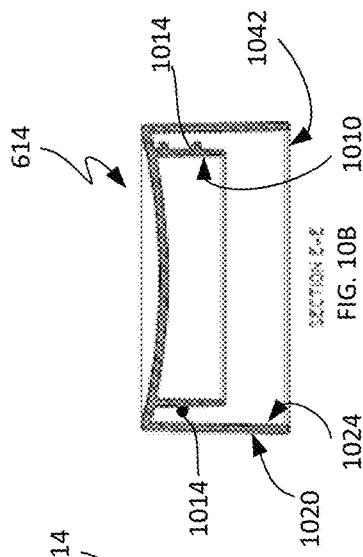
FIG. 10B
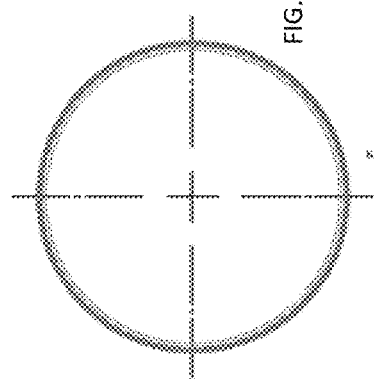
FIG. 10E
FIG. 10A
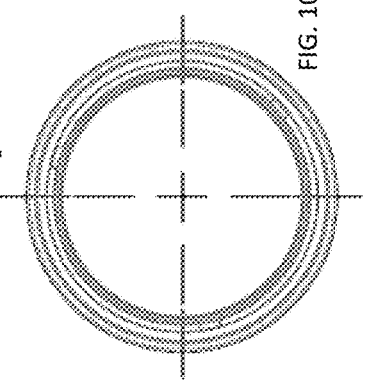
FIG. 10F

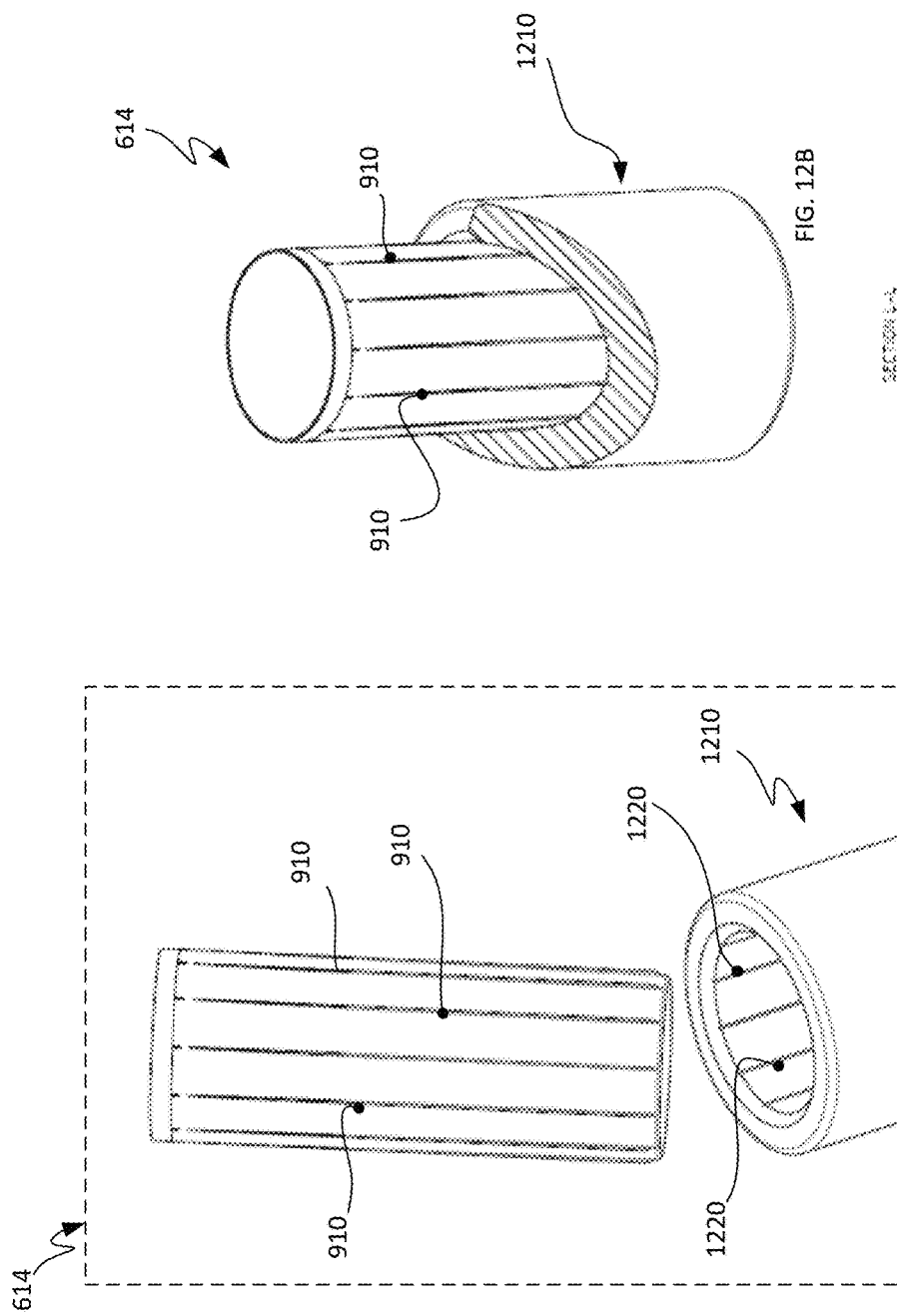
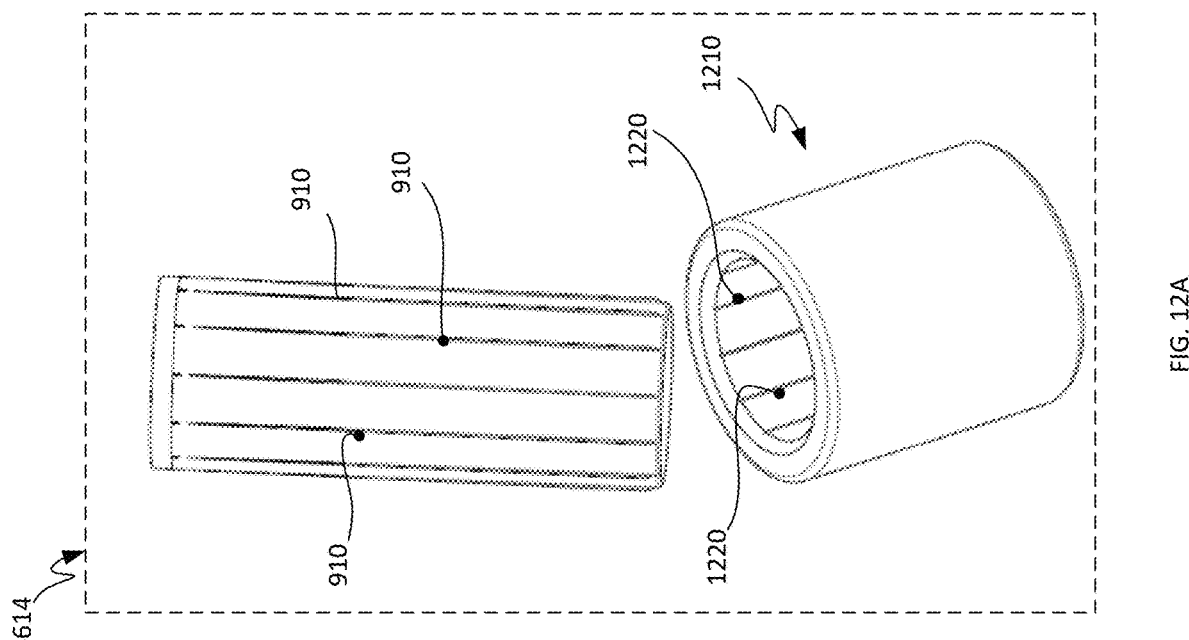

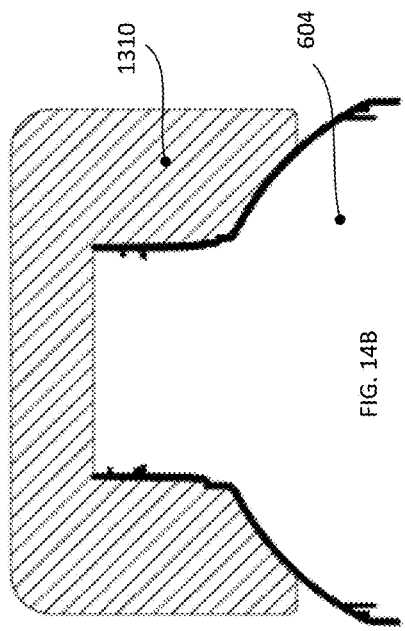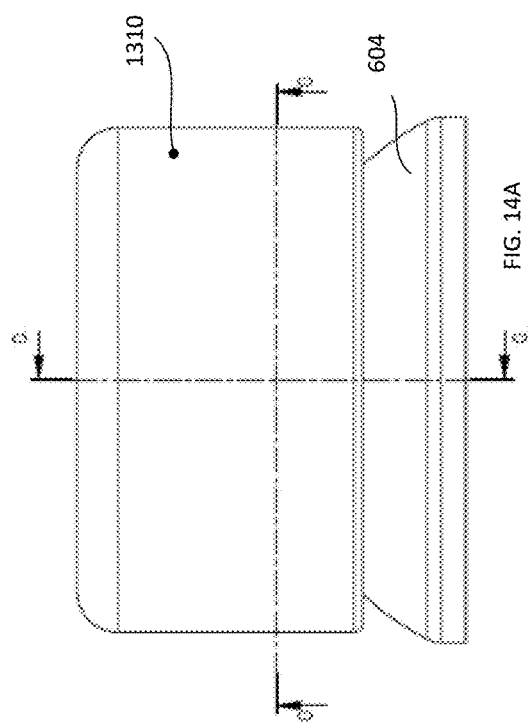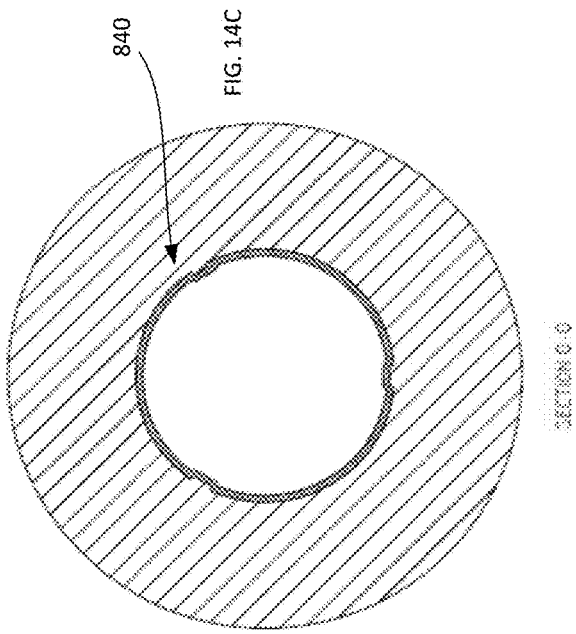

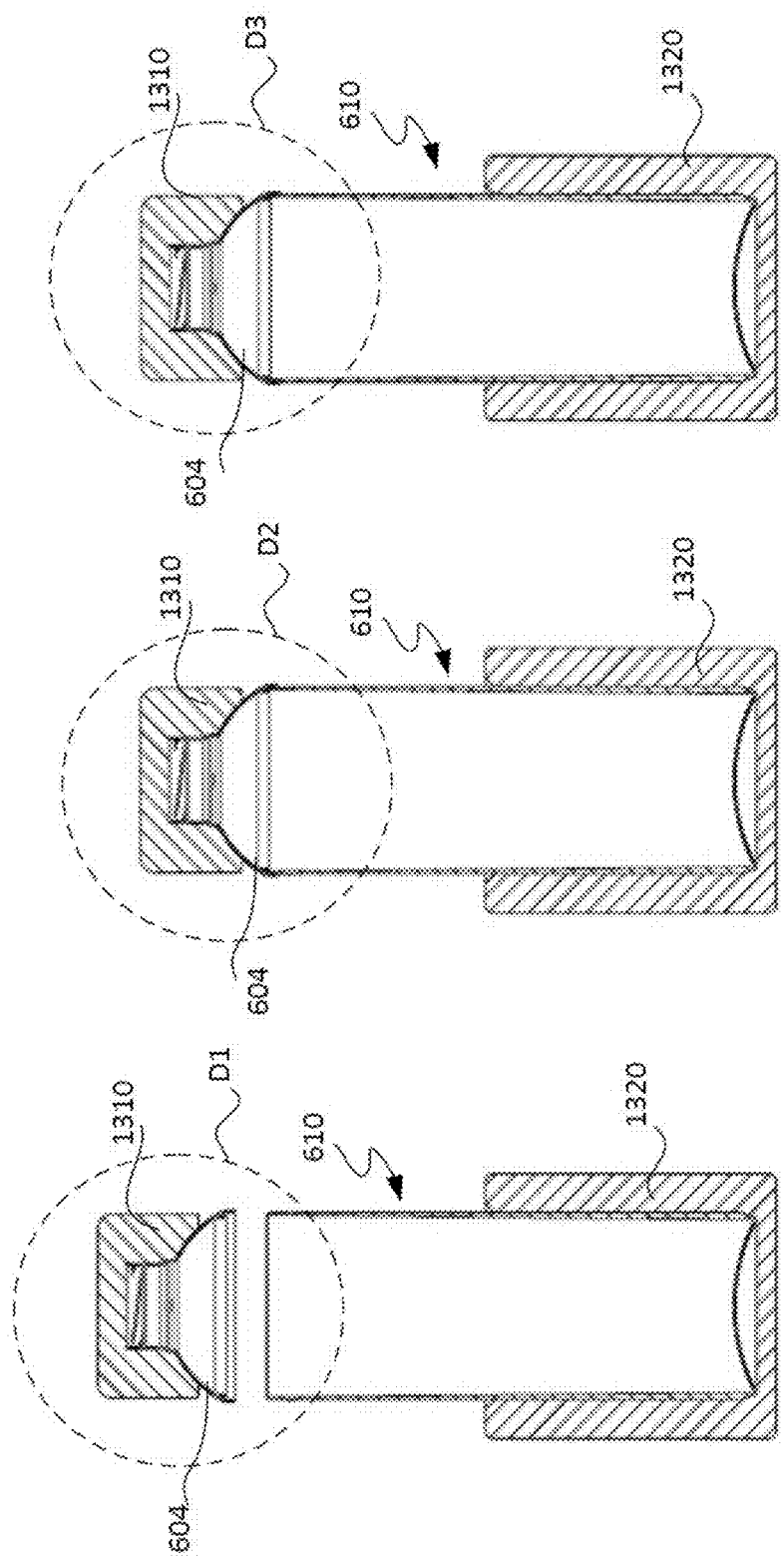

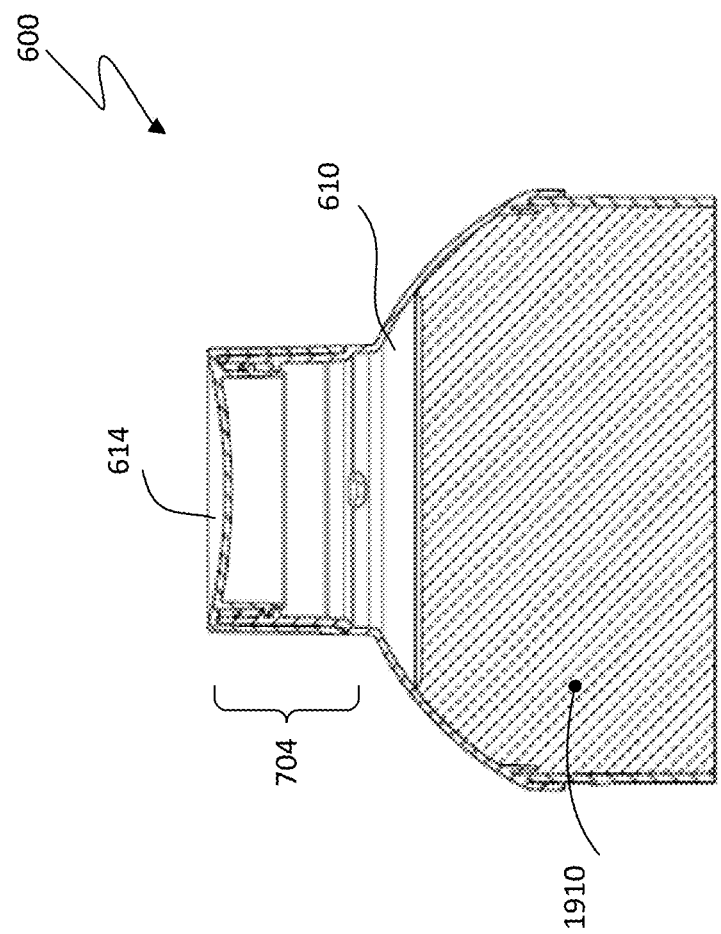

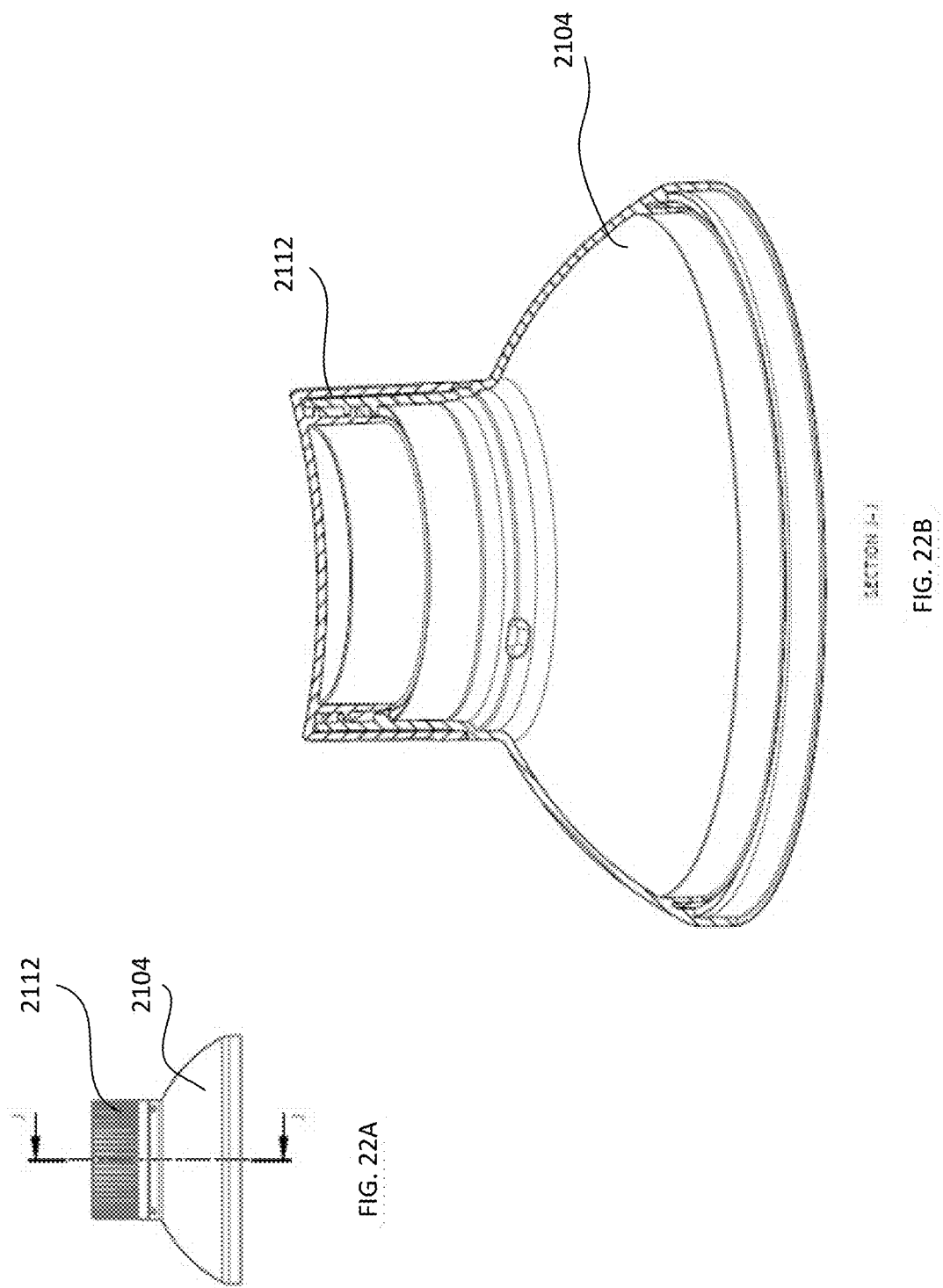

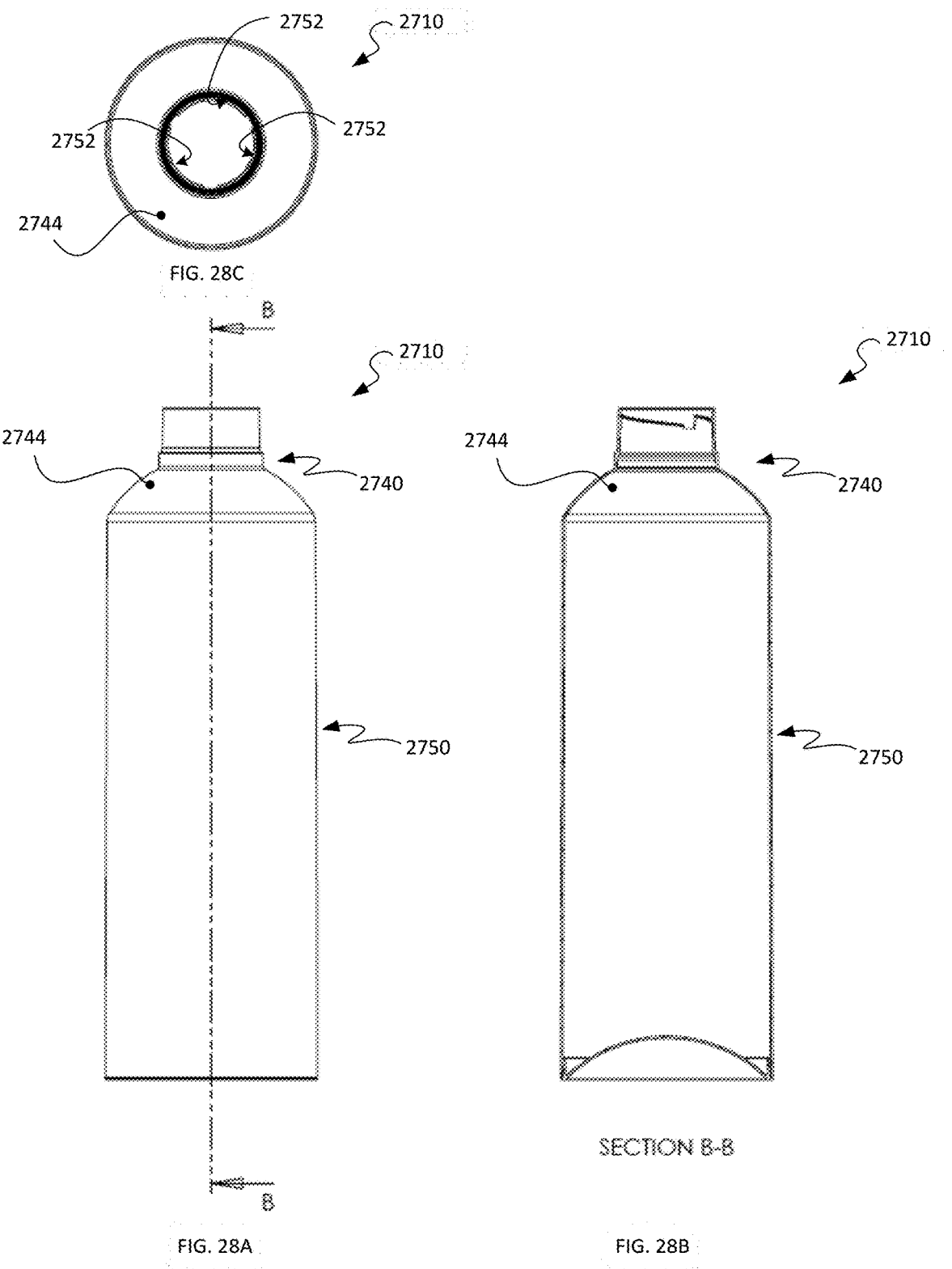

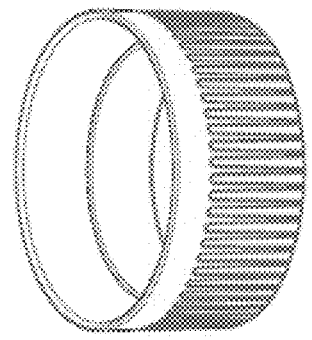
FIG. 29A
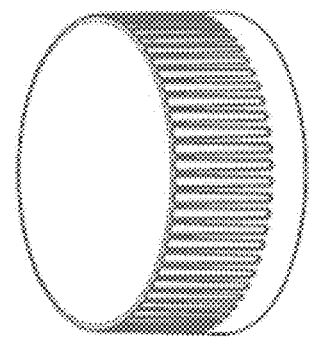
FIG. 29B
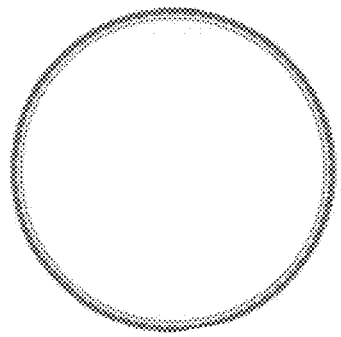
FIG. 29C
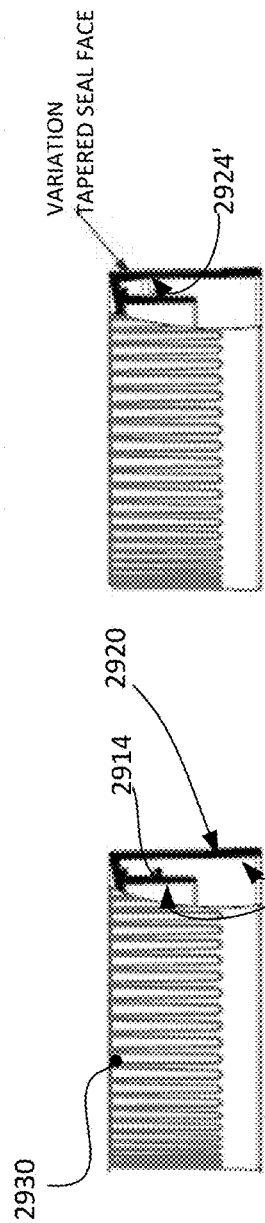
FIG. 29D
FIG. 29E
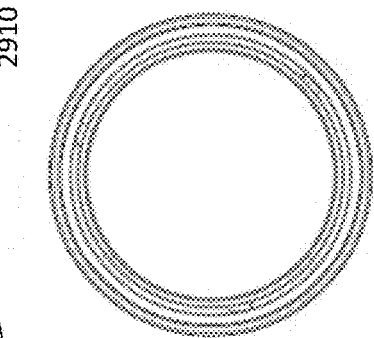
FIG. 29F

FIG. 31C
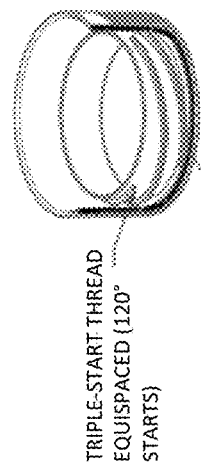
TRIPLE-START THREAD EQUISPACED (120° STARTS)
THREAD RUNS INTO DOME
FIG. 31G
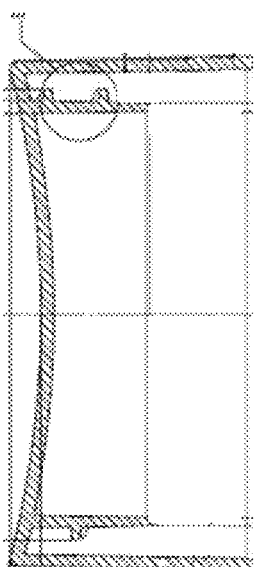
FIG. 31B
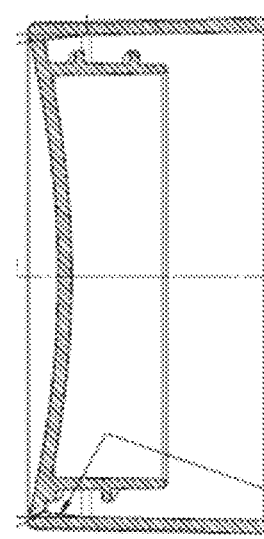
ADDITIONAL SEALING SURFACE
FIG. 31F
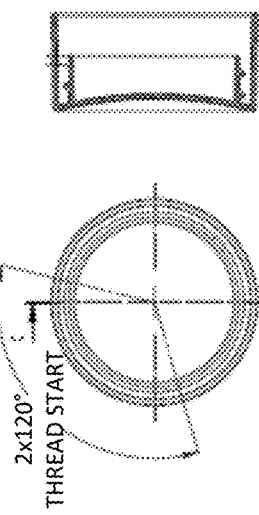
FIG. 31E
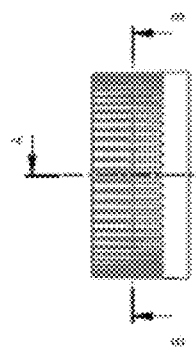
2x120° THREAD START
FIG. 31A
FIG. 31D
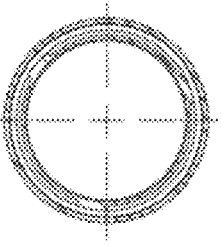
FIG. 31H

INJECTION MOLDED POLYMERIC BIODEGRADABLE CONTAINER

CROSS-REFERENCE TO RELATED APPLICATIONS

The present application claims the benefit of priority under 35 U.S.C. § 119(e) of U.S. Provisional Application No. 62/656,253, entitled BIODEGRADABLE PACKAGING CONTAINER, filed on Apr. 11, 2018, and of U.S. Provisional Application No. 62/699,532, entitled SEGMENTED BIODEGRADABLE CONTAINER HAVING TUBULAR SHELL, filed on Jul. 17, 2018, the contents of each of which is hereby incorporated by reference in its entirety for all purposes.

FIELD

The disclosure relates generally to biodegradable packaging containers.

BACKGROUND

Packaging used for containing liquids generates large amounts of waste. Recycling of packaging used for containment of liquids can be inconsistent, costly and despite many efforts harmful to the environment. Not every non-biodegradable part or packaging component is pulled out into a recycling stream, leaving potentially harmful packaging in landfills or other waste management systems.

Efforts towards creating an environmentally efficient container/package system that is cost effective, carbon effective and readily recyclable while being very usable for dispensing liquids, aggregates or powders and performing as a container for distribution through typical retail logistic chains have been increasing.

Traditionally, many beverages such as wine, beer and milk have been supplied in glass bottles. The glass used to make these bottles may itself be recycled. However, the energy required to make the bottles is high. Also, the weight of the resulting packaging is high, increasing the amount of energy required to transport the products. While the glass can be recycled, this does require that the bottles are separated from other waste, for example by users separating the glass bottles from other household waste for collection. Therefore, it is often the case that glass bottles are disposed of with other waste. In this case, the glass bottles may be disposed of in a landfill site. This is a problem since, unlike some other forms of waste, glass is not biodegradable.

More recently, it has become common to use bottles made from plastics, such as PET or HDPE, for liquid such as water, juice, carbonated drinks, or milk. In this case, it is common for the bottles to be formed from virgin, i.e., non-recycled, material to ensure that the liquid contained within the bottle is not contaminated as could be the case if the containers were formed from recycled material. While the material itself could be recycled if separated from other waste, as with glass bottles this frequently does not occur due to the need for the waste producer, such as a householder, to separate the containers from other waste material. Again, if the container is disposed of in a landfill site or the like, the bottle is not biodegradable. Also, bottles take up a volume larger than that of the material itself due to their hollow, rigid, structure, and therefore take up an excessive amount of space in a landfill site.

It has also been proposed to package liquid in laminated cardboard containers, for example in containers marketed by Tetra Pak. In this case, the cardboard from which the body of the container is formed may be virgin or recycled material. The cardboard is laminated with a waterproof coating. This ensures that the container is able to hold liquid and also acts as a barrier between the liquid and the cardboard, which can prevent contamination of the liquid from the cardboard. This is especially needed where the cardboard is formed from recycled material. A problem with such packages is that they are difficult to recycle, and the waterproof coating prevents them fully decomposing. The problem is exacerbated when a plastic dispensing nozzle or cap is formed as part of the package for dispensing the contents. This is another component that would need to be separated before the container can be recycled or parts of this be allowed to decompose.

In some countries, liquid such as milk is packaged in bags. However, these bags have little structural stability, and therefore are difficult to transport and to stack on shelves. They are often not re-sealable, making them hard to hold and carry.

It is known to package wine in boxes. These comprise a box body, typically formed of laminated cardboard, which provides the structure for the package. A bag is provided within the box, the wine being contained within the bag. A dispensing tap is often connected to the bag, and when in use is arranged to protrude through a side opening in the box. In such instances, the spout is made to protrude or hang outside of the box for dispensing. The weight of the liquid is usually distributed along the box bottom and is not supported by the dispensing tap protruding from the box. For the efficient disposal of such a container, each of the parts made from different materials would be also separated, namely the bag from the box, the dispensing tap from the bag, and the lamination from the cardboard forming the box. This separation of packaging components is difficult and prevents such packages from being disposed of or recycled efficiently.

Furthermore, in some cases bottles or other liquid containers contain additional, separable components that do not make it into a recycling bin. For example, loose caps, straws, and plastic tamperproof or tamper-evident devices can contribute to overall litter in the environment. Even if bottles make it into a recycling bin or garbage can, their caps or other types of closures often end up as general litter.

Containers produced using biodegradable molded fibers or pulp have been developed in recent years. Attempts at creating stable manufacturing methods for sealed pulp containers have been so far minimal in their effectiveness and usefulness as traditional molding methods have not been able to solve the issues of failsafe assembly of pulp parts so as to contain the materials inside in a consistent, repeatable fashion. Functionally, aesthetically, and manufacturability are all deficiencies of molded fiber biodegradable containers currently available on the market. There is a desire and need to ensure correct tolerances are met during the pulp container assembly process.

SUMMARY

The disclosure generally pertains to biodegradable containers for holding materials, such as solids and liquids, and to methods for making the same.

In one aspect, the disclosure relates to a biodegradable container including a cylindrical polymeric body element and a polymeric top dome element. The dome element includes a dome portion and a cylindrical neck, the dome portion being welded to the cylindrical polymeric body portion. A paper sleeve surrounds the cylindrical polymeric body element. A polymeric cap defines an internal rim configured to be received by an inner surface of the cylindrical neck. A surface of the internal rim may define one or more threads configured to engage corresponding threads defined by the inner surface of the cylindrical neck.

In another aspect the cylindrical polymeric body element is injection-molded and defines a set of exterior ribs extending from a circumference defined by an external surface of a body of the cylindrical polymeric body element, the paper sleeve being supported by the set of exterior ribs. The set of external ribs may be parallel to the longitudinal axis of the biodegradable container. One or more of the set of external ribs may define a barb to retain the paper sleeve.

In a further aspect the polymeric cap includes an outer cylindrical cover configured to extend over the outer surface of the cylindrical neck. The outer cylindrical cover may include a sealing lip disposed to form a seal between an interior surface of the outer cylindrical cover and the outer surface of the cylindrical neck to prevent contaminants from reaching drinking surfaces on the cylindrical neck. A seal may also be formed between the internal rim surface and the inner surface of the cylindrical neck to enable pressurization of the container.

In yet another aspect a tamper-evident label is affixed to an exterior surface of the cylindrical neck and an exterior surface of the polymeric cap.

In another aspect the polymeric top dome element may define one or more indentations configured to engage tooling for spin welding of the polymeric top dome element to the cylindrical polymeric body element.

The disclosure also pertains to a method of producing a biodegradable container. The method includes injection molding a polymeric material into a cylindrical polymeric body element and a polymeric top dome element. The injection molding may include forming the polymeric top dome element so as to include a dome portion and a cylindrical neck defining an aperture. The injection molding may also include forming the cylindrical body element so as to include a plurality of ribs extending from an external surface of the cylindrical body element. The method includes welding a lower lip of the dome portion to an upper lip of the cylindrical polymeric body element. The method further includes sliding a cylindrical paper sleeve around a periphery of the cylindrical polymeric body element so as to envelop the cylindrical polymeric body element. The cylindrical paper sleeve may be supported by the plurality of ribs.

In another aspect the method includes further capping the aperture using a polymeric cap having a threaded internal rim circumscribed by an external cap cover, the threaded internal rim being received by a threaded surface of the cylindrical neck and the external cap cover covering an external surface of the cylindrical neck In a further aspect the method includes affixing a tamper-evident label to an exterior surface of the cylindrical neck and an exterior surface of the external cap cover.

In yet another aspect the method includes introducing a sealing element between the threaded internal rim and the threaded surface of the cylindrical neck.

In an additional aspect the welding includes using tooling to spin weld the polymeric top dome element to the upper lip of the cylindrical polymeric body element wherein the tooling is configured to engage one or more indentations defined by the polymeric top dome element. The tooling may be further configured to engage one or more ribs defined by the cylindrical polymeric body element so as to prevent rotation of the cylindrical polymeric body element.

The disclosure is also directed to a biodegradable container including a unitary polymeric body element having a top portion and a cylindrical body portion. The top portion has a cylindrical neck wherein the cylindrical neck defines an inner surface and an outer surface. The container further includes a polymeric bottom element welded to the cylindrical body portion of the unitary polymeric body element. A polymeric cap defines an internal rim configured to be received by the inner surface of the cylindrical neck. The polymeric cap includes an external cover having an interior surface which may be tapered so that the outer surface of the cylindrical neck and the interior surface of the external cover form an inner seal. Alternatively, an inner seal may be formed when a tri-start internal thread defined by the inner surface of the cylindrical neck engages a thread defined by the internal rim of the polymeric cap. The interior surface of the external cover may also form an outer seal with the outer surface of the cylindrical neck when the polymeric cap is in a closed position.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

For a better understanding of the nature and objects of various embodiments of the invention, reference should be made to the following detailed description taken in conjunction with the accompanying drawings, wherein:

FIG. 1A is a diagram providing a side view of an assembled biodegradable container comprising a polymeric body element covered by a paper sleeve, a polymeric top dome element welded to the polymeric body element, a polymeric cap, and a tamper-evident seal in accordance with an embodiment.

FIG. 1B is a sectional view along a longitudinal axis of the biodegradable container of FIG. 1A.

FIG. 1C is a perspective view of the biodegradable container of FIG. 1A.

FIG. 1D is perspective view of the biodegradable container of FIG. 1A in an inverted orientation.

FIG. 1E is a top view of the container of FIG. 1A.

FIG. 1F is a bottom view of the container of FIG. 1A.

FIG. 1G is a sectional view along a transverse axis of the biodegradable container of FIG. 1A.

FIGS. 3A-3D are alternate perspective views of the biodegradable container of FIG. 1A which provide various views of a tamper-evident seal affixed to the container.

FIG. 7A is a side view of a polymeric top dome element for a container.

FIG. 7B is a sectional view along a longitudinal axis of the top dome element of FIG. 7A.

FIG. 7C is a top perspective view of the top dome element of FIG. 7A.

FIG. 7D is a perspective view of the top dome element of FIG. 7A in an inverted orientation.

FIG. 7E is a top view of the top dome element of FIG. 7A.

FIG. 7F is a bottom view of the top dome element of FIG. 7A.

FIG. 9A is a side view of a polymeric body element for a container.

FIG. 9B is a sectional view along a longitudinal axis of the polymeric body element of FIG. 9A.

FIG. 9C is a top perspective view of the polymeric body element of FIG. 9A.

FIG. 9D is a perspective view of the polymeric body element of FIG. 9A in an inverted orientation.

FIG. 9E is a top view of the polymeric body element of FIG. 9A.

FIG. 9F is a bottom view of the polymeric body element of FIG. 9A.

FIG. 10A is a side view of a polymeric cap for a container.

FIG. 10B is a sectional view along a longitudinal axis of the polymeric cap of FIG. 10A.

FIG. 10C is a top perspective view of the polymeric cap of FIG. 10A.

FIG. 10D is a perspective view of the polymeric cap of FIG. 10A in an inverted orientation.

FIG. 10E is a top view of the polymeric cap of FIG. 10A.

FIG. 10F is a bottom view of the polymeric cap of FIG. 10A.

FIG. 12A is a side view of a polymeric body element for a container together with a perspective view of tooling configured to engage external ribs of the polymeric body element during a spin welding operation.

FIG. 12B is a perspective view of a polymeric body element and a partially cutaway perspective view of tooling engaging the polymeric body element to facilitate the spin welding operation.

FIG. 14A is a side view of a polymeric top dome element of a container engaged by tooling configured to spin weld the polymeric top dome element to a body element of the container.

FIG. 14B is a longitudinal sectional view of the top dome element and tooling of FIG. 14A.

FIG. 14C is a transverse sectional view of the top dome element and tooling of FIG. 14A which illustrates indentations for tooling engagement defined by the top dome element.

FIG. 17A is a side view of a polymeric top dome element for an uncapped container engaged by tooling, shown in section, together with a sectional view of a polymeric body element of the uncapped container engaged by tooling disposed to spin weld the elements.

FIGS. 17B and 17C illustrate opposite side and sectional views of the uncapped container and spin weld tooling of FIG. 17A with the polymeric top dome element and the polymeric body element welded together.

FIG. 20 is a magnified sectional view of an upper portion of the filled biodegradable container of FIG. 19B.

FIGS. 22A and 22B are side and sectional views, respectively, of a polymeric top dome portion of a container sealed with a polymeric cap.

FIGS. 28A and 28B are a side view and a longitudinal sectional view, respectively, of an embodiment of a unitary polymeric body element.

FIG. 28C is a top view of the embodiment of the unitary polymeric body element of FIG. 28A.

FIG. 29A is a top view of the cap included within the biodegradable container of FIG. 27A.

FIG. 29B is a top perspective view of the cap included within the biodegradable container of FIG. 27A.

FIG. 29C is a bottom perspective view of the cap included within the biodegradable container of FIG. 27A.

FIG. 29D is a partially cutaway side view of a first embodiment of the cap included within the biodegradable container of FIG. 27A.

FIG. 29E is a partially cutaway side view of a second embodiment of the cap included within the biodegradable container of FIG. 27A.

FIG. 29F is a bottom view of the cap included within the biodegradable container of FIG. 27A.

FIG. 31A is a side view of the cap included within the biodegradable container of FIG. 27A.

FIG. 31B is a side sectional view of the cap included within the biodegradable container of FIG. 27A.

FIG. 31C is a magnified view of a portion of a defining tri-start threads.

FIG. 31D is a bottom view of the cap included within the biodegradable container of FIG. 27A.

FIG. 31E is a bottom view of the cap included within the biodegradable container of FIG. 27A.

FIG. 31F is a longitudinal sectional view of the second embodiment of the cap included within the biodegradable container of FIG. 27A.

FIG. 31G is an inverted and partially transparent perspective view of the second embodiment of the cap included within the biodegradable container of FIG. 27A.

FIG. 31H is a transverse sectional view of the second embodiment of the cap included within the biodegradable container of FIG. 27A.

DETAILED DESCRIPTION

Figure 2B:
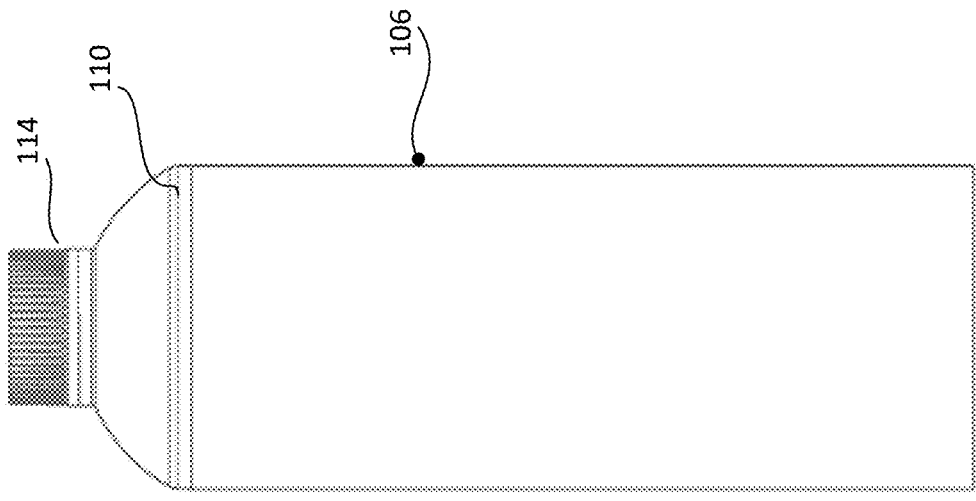
FIGS. 2A and 2B are views of opposite sides of the biodegradable container of FIG. 1A.

The disclosure provides for biodegradable containers comprising parts selected from the group including a polymeric body element, a spiral-wound paper sleeve disposed to envelop or otherwise cover the polymeric body element, a polymeric top dome element welded to the polymeric body element, a polymeric cap, a tamper-evident seal affixed to the polymeric cap and the polymeric top dome element, an internal seal between and internal rim of the polymeric cap and an inner surface of a neck of the polymeric top element, and an external seal between an outer rim of the polymeric cap and an outer surface of the neck of the polymeric top element.

These container parts described herein can be interchanged or combined with various illustrations of the disclosed embodiments.

The containers described herein can be used for the delivery and/or storage of beverages for human consumption or for the delivery of other materials not for human consumption. Examples of materials that can be contained include beverages, syrups, concentrates, soaps, inks, gels, solids, and powders. The polymeric cap, polymeric top dome element and polymeric body element can be preferably comprised of one type of a fully biodegradable material such as a type of polyhydroxyalkanoate (PHA), e.g., polyhydroxybutyrate (PHB), facilitating full recycling and minimal negative impact on environment. In other embodiments these components of the container can be made significantly of one type of similar biodegradable material.

The polymeric top dome element can be joined to the polymeric body element utilizing, for example, spin welding or sonic welding, or alternative bonding, sealing, or gluing techniques. Fluid can be dispensed from the container by pouring, sucking, squirting, or other means. The polymeric body element is designed in the embodiments to enhance strength and rigidity without compromising on aesthetics and ergonomics. The polymeric body element can resist side force on the container sufficient to allow the container to be picked up in one hand and the beverage or materials to be dispensed in a controlled fashion.

In one embodiment a complete biodegradable container assembly may be created by, for example, injection molding a polymeric material into a cylindrical polymeric body element and into a polymeric top dome element. The polymeric top dome element may include a dome portion and a cylindrical neck defining an aperture and the cylindrical body element may include a plurality of ribs extending from an external surface. Following the injection molding operation, a lower lip of the dome portion may be spin welded to an upper lip of the cylindrical polymeric body element. To facilitate the spin welding, the dome portion may include indentations for receiving tooling configured to spin the top dome element relative to the cylindrical body element. Other tooling may engage the plurality of ribs of the cylindrical body element in order to render it stationary relative to the top dome element. Once the spin welding has been performed, a spiral-wound paper sleeve may be slid onto the cylindrical polymeric body element such that it is supported by the plurality of ribs.

The container may include a polymeric cap having a threaded internal rim circumscribed by an external cap cover. The threaded internal rim is received by a threaded internal surface of the cylindrical neck. Once the cap is so received by the internal surface of the cylindrical neck, the external cap cover covers an external surface of the cylindrical neck. A tamper-evident label may be affixed to an exterior surface of the cylindrical neck and to an exterior surface of the external cap cover.

In one embodiment a grade of PHA that is not compounded is utilized so that injection-molding (IM) grades can be pure. The walls of the polymeric body element may be of 0.5 draft internally is minimum to maximize volume in straight shape.

Referring now to the drawings, FIGS. 1A and 1B are side and longitudinal sectional views, respectively, of an assembled biodegradable container 100 in accordance with an embodiment. The biodegradable container 100 includes a polymeric body element 104 covered by a paper sleeve 106, a polymeric top dome element 110 welded to the polymeric body element 104, a polymeric cap 114, and a tamper-evident label 118 in accordance with an embodiment. In the embodiment of FIGS. 1A and 1B, the tamper-evident label 118 does not extend completely around the circumference of the container 100; however, in other embodiment the label 118 may completely encircle the container 100.

As shown, FIG. 1C is a perspective view of the biodegradable container of FIG. 1A. FIG. 1D is perspective view of the biodegradable container of FIG. 1A in an inverted orientation. FIG. 1E is a top view of the container of FIG. 1A. FIG. 1F is a bottom view of the container of FIG. 1A. FIG. 1G is a sectional view along a transverse axis of the biodegradable container of FIG. 1A.

Figure 2A:
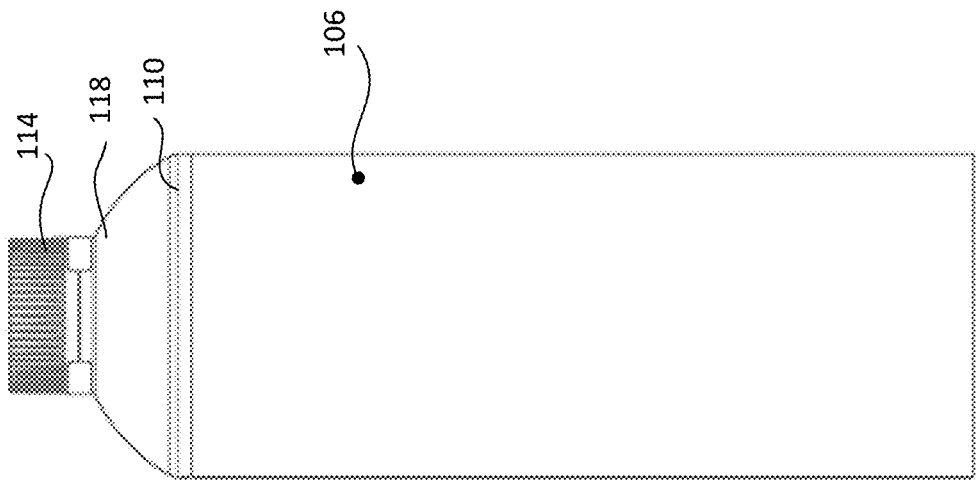

FIGS. 2A and 2B are views of opposite sides of the biodegradable container 100 of FIG. 1A. FIGS. 2A and 2B are relatively rotated about a longitudinal axis of the container 100 so as to depict different views of the tamper-evident seal 118. In addition, FIGS. 3A-3D are alternate perspective views of the biodegradable container 100 of FIG. 1A which provide various other views of the tamper-evident seal 118 affixed to the container 100.

Figure 4B:
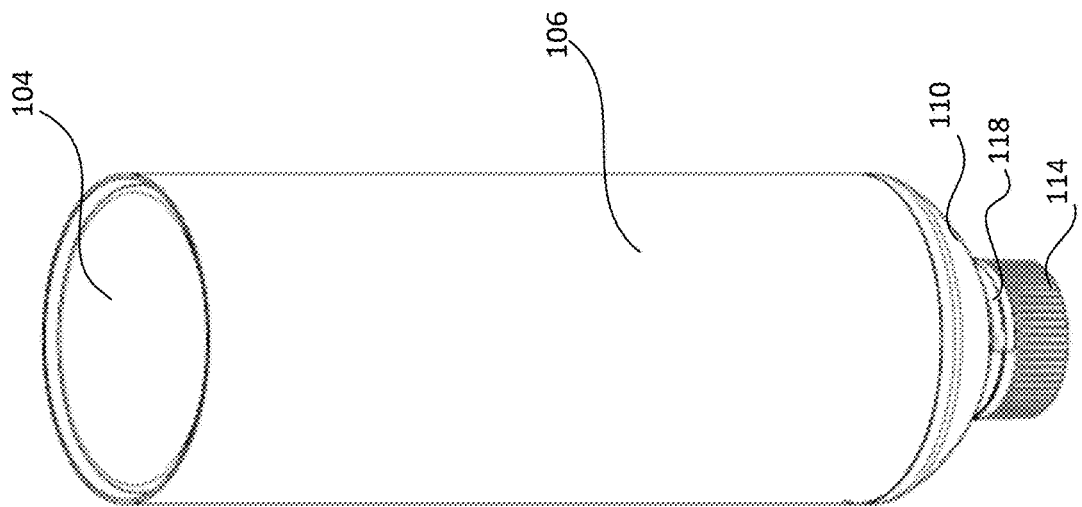
FIGS. 4A-4B are alternate perspective views of the biodegradable container of FIG. 1A in an inverted orientation.
Figure 4A:
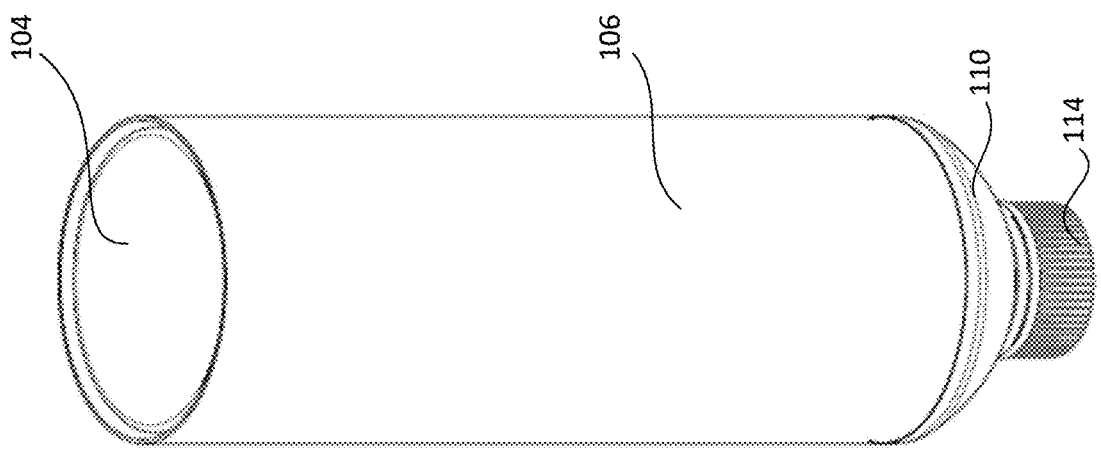

FIGS. 4A-4B are alternate perspective views of the biodegradable container 100 of FIG. 1A in an inverted orientation which depict an implementation of the tamper-evident seal 118 from different perspectives.

Figure 5A:
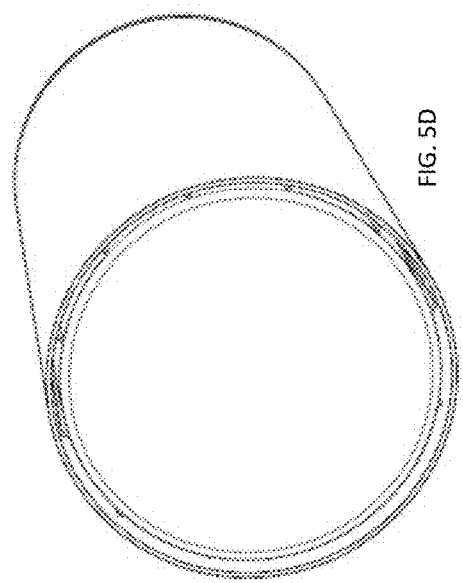
FIG. 5A is another side view of an assembled biodegradable container comprising a polymeric body element covered by a paper sleeve, a polymeric top dome element welded to the polymeric body element, a polymeric cap, and a tamper-evident seal in accordance with an embodiment.

FIG. 5A is another side view of an assembled biodegradable container comprising a polymeric body element covered by a paper sleeve, a polymeric top dome element welded to the polymeric body element, a polymeric cap, and a tamper-evident seal in accordance with an embodiment.

Figure 5C:
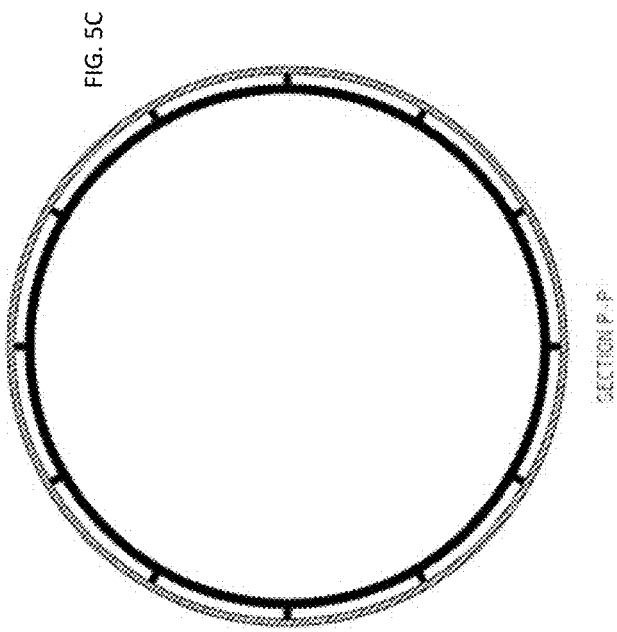
FIG. 5C is a transverse sectional view of the container of FIG. 5A illustrating the manner in which the plurality of external ribs of the polymeric body unit provide support for the paper sleeve.
Figure 5D:
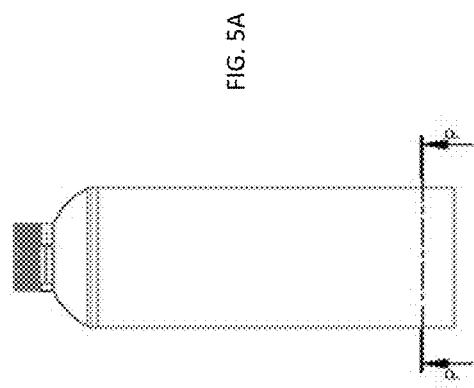
FIG. 5D is a bottom perspective view of the container of FIG. 5A.
Figure 5B:
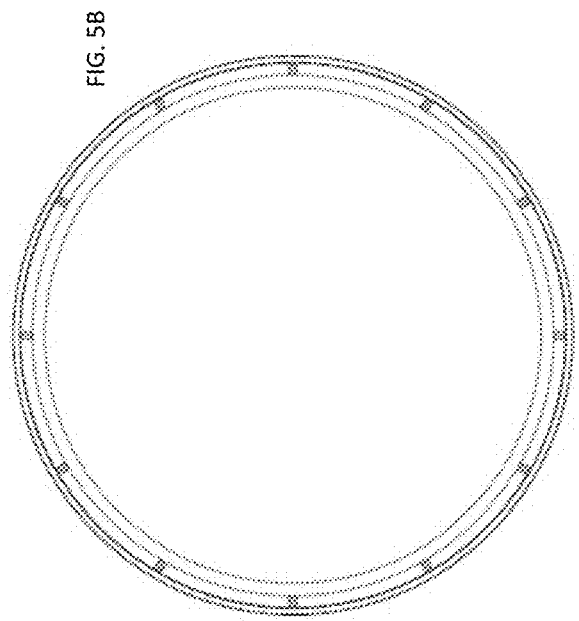
FIG. 5B is a bottom view of the container of FIG. 5A illustrating the manner in which a plurality of external ribs of the polymeric body unit provide support for the paper sleeve.

FIG. 5B is a bottom view of the container of FIG. 5A illustrating the manner in which a plurality of external ribs of the polymeric body unit provide support for the paper sleeve.

FIG. 5C is a transverse sectional view of the container of FIG. 5A illustrating the manner in which the plurality of external ribs of the polymeric body unit provide support for the paper sleeve.

FIG. 5D is a bottom perspective view of the container of FIG. 5A.

Figure 6:
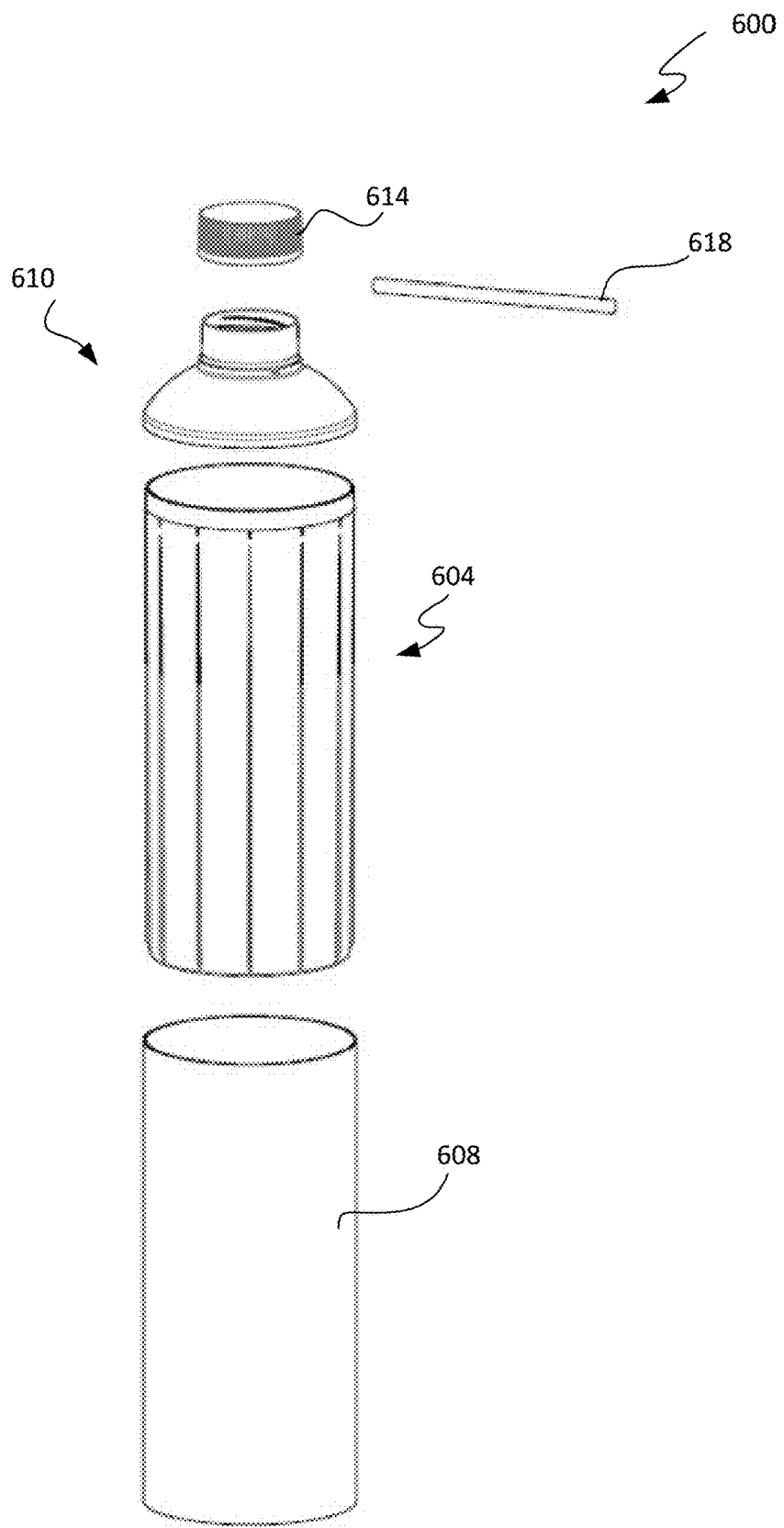
FIG. 6 is a perspective exploded view diagram of a biodegradable container comprising a polymeric body element, a paper sleeve disposed to cover the polymeric body element, a polymeric top dome element configured to be welded to the polymeric body element, a polymeric cap, and a tamper-evident seal in accordance with an embodiment

FIG. 6 is a perspective exploded view diagram of a biodegradable container 600 comprising a polymeric body element 604, a paper sleeve 608 disposed to cover the polymeric body element 604, a polymeric top dome element 610 configured to be welded to the polymeric body element 604, a polymeric cap 614, and a tamper-evident label 618 in accordance with an embodiment.

FIGS. 7A-7F illustrate an embodiment of the top dome element 610 in greater detail. Specifically, FIG. 7A is a side view of the polymeric top dome element 610; FIG. 7B is a sectional view along a longitudinal axis of the top dome element 610; FIG. 7C is a top perspective view of the top dome element 610; FIG. 7D is a perspective view of the top dome element 610 in an inverted orientation; FIG. 7E is a top view of the top dome element 610; and FIG. 7F is a bottom view of the top dome element 610.

As shown most clearly in in FIGS. 7B and 7C, the top dome element 610 includes a cylindrical neck 704 and a dome portion 708. In one embodiment the wall thickness of the tope dome element 610 is made to be relatively thin in order to aid in its biodegradation. An external surface 710 of the cylindrical neck 704 forms a sealing face configured to be substantially flush with an inner surface of an external cover of the cap 614 (FIGS. 10A-10F). An internal surface 712 of the cylindrical neck 704 defines a tri-start internal thread 716 configured to engage a thread defined by an inner rim of the cap 614 (FIGS. 10A-10F). A sealing rim 724 is designed to prevent contaminates from entering an interior of the container 600. In one embodiment an optional inner rim 728 contains welding flash. In addition, a split line 732 may be defined on a top lip of the cylindrical neck 704.

Figure 8D:
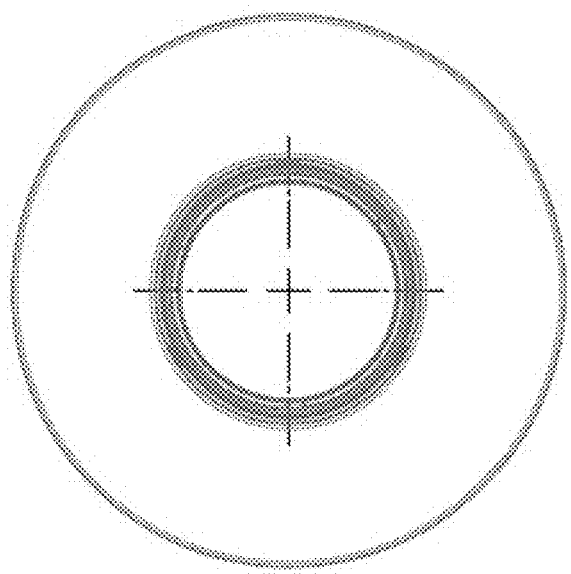
FIG. 8D is a top view of the top dome element of FIG. 8A.
Figure 8B:
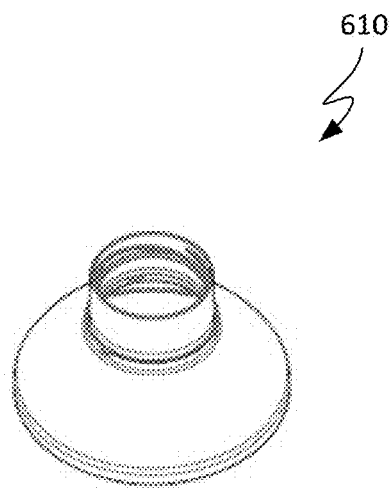
FIG. 8B is a perspective view of the top dome element of FIG. 8A.
Figure 8A:
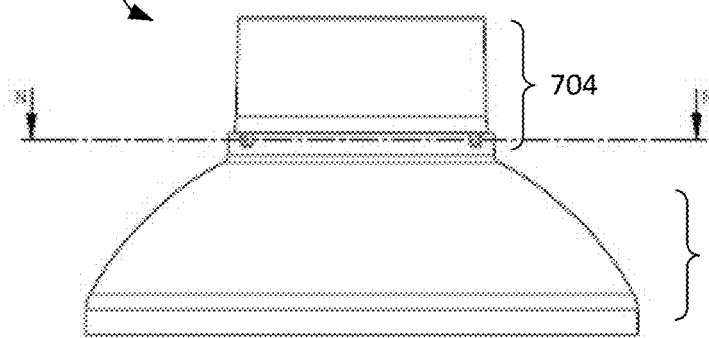
FIG. 8A is another side view of a polymeric top dome element for a container.
Figure 8C:
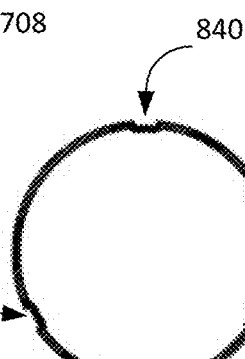
FIG. 8C is a sectional view along a transverse axis of the top dome element of FIG. 8A which illustrates indentations defined by the top dome element for engaging spin-weld tooling.
Figure 8E:
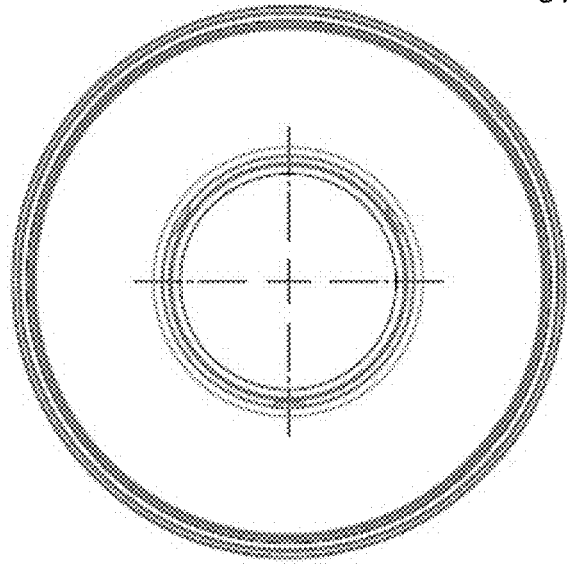
FIG. 8E is a bottom view of the top dome element of FIG. 8A.
Figure 11C:
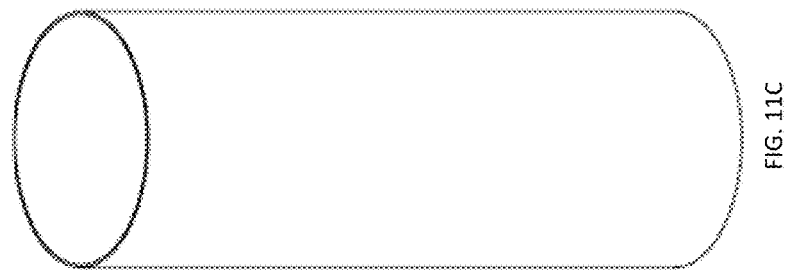
FIG. 11C is a top perspective view of the paper sleeve of FIG. 11A.
Figure 11B:
FIG. 11B is a sectional view along a longitudinal axis of the paper sleeve of FIG. 11A.
Figure 11D:
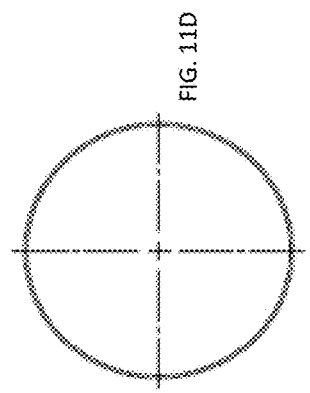
FIG. 11D is an end view of the paper sleeve of FIG. 11A.
Figure 11A:
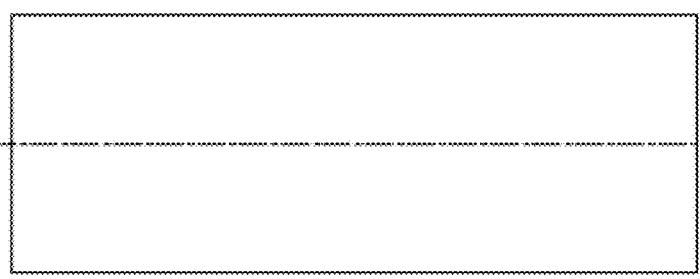
FIG. 11A is a side view of a spiral-wound paper sleeve for a container.

FIGS. 8A-8E illustrate additional details of an embodiment of the top dome element 610. As is illustrated by FIG. 8C, which is a section view corresponding to a transverse plane proximate a top of the dome portion 808, a dome rim of the dome portion 808 may define a set of indentations 840 or other recesses configured to be engaged by tooling used in spin welding of the top dome element 610 and the polymeric body element 604. These indentations 840 may match teeth in the spin weld tooling in order to transmit torque into the weld joint. In one embodiment the indentations 840 or other recesses are made to be relatively small to improve aesthetics of the container 600 (e.g., to enable the indentations 840 to be hidden by the tamper-evident label 618) and to minimize detrimental effects on sealing or adhesion of the label 618 to the top dome element 610.

In one embodiment at least the top dome element 610 and body element 604 are injection molded using a material such as a form of PHA. In this embodiment it may be particularly advantageous to spin weld the top dome element 610 to the body element 604 since this may be done inexpensively and results in a uniform seal between the two components. In one embodiment the walls of the top dome element 610 to the body element 604 are very thin and essentially all available thickness of each is used in spin welding the parts together. The optional internal rim 728 keeps the flash in check. In other embodiments the top dome element 610 to the body element 604 could be sonic welded are alternatively welded or otherwise joined together.

FIGS. 9A-9F provide various views of the polymeric body element 604. Specifically, FIG. 9A is a side view of a polymeric body element 604; FIG. 9B is a sectional view along a longitudinal axis of the polymeric body element 604; FIG. 9C is a top perspective view of the polymeric body element 604; FIG. 9D is a perspective view of the polymeric body element 604 in an inverted orientation; FIG. 9E is a top view of the polymeric body element 604; and FIG. 9F is a bottom view of the polymeric body element 604.

As shown, the polymeric body element 604 includes a plurality of external ribs 910 supported by a main body 920. It has been found that the external ribs 910 facilitate in-mold material flow in the injection molding process and provide support for the spiral-wound paper sleeve 608. One or more of the ribs 910 may also include a barbed section to retain the paper sleeve 608 in a fixed position once it has been slide over the ribs 910. In one embodiment each of the external ribs 910 has a rounded end shape that allows for zero draft in a longitudinal direction, which facilitates the molding process.

As is discussed below, the external ribs 910 may be engaged by tooling to hold or otherwise maintain the polymeric body element in as fixed position during the spin molding process as the top dome element 610 is rotated.

The main body 920 will preferably have relatively thin walls to aid in biodegradation and will preferably be formed through a line-of-draw injection molding process. In one embodiment the nominal draft of walls of the main body is 0.5°.

Attention is now directed to FIGS. 10A-10F, which provide various views of the polymeric cap 614. Specifically, FIG. 10A is a side view of the polymeric cap 614; FIG. 10B is a sectional view along a longitudinal axis of the polymeric cap 614; FIG. 10C is a top perspective view of the polymeric cap of 614; FIG. 10D is a perspective view of the polymeric cap 614 in an inverted orientation; FIG. 10E is a top view of the polymeric cap 614; and FIG. 10F is a bottom view of the polymeric cap 614.

As shown, the cap 614 includes an internal rim 1010 which defines a hidden tri-start thread 1014 and an external cover 1020. When the cap 614 is received by the neck of the 704 of the top dome element 610, the thread 1014 engages the tri-start internal thread 716 of the neck 704. In addition, when the cap 614 is in a closed position an inner surface 1024 of the cover 1020 covers the external surface 710 of the cylindrical neck 704.

The external cover 1020 also defines a plurality of recesses 1030, i.e., sections of reduced wall thickness. These reduced-thickness recesses 1030 aid in biodegradation and provide a grip for opening and closing the container 600 using the cap 614. In one embodiment a nominal wall thickness within the recesses 1030 is 0.75 mm with a nominal draft of 0.5°.

In one embodiment the cap 614 seals on the internal rim 1010 below the thread 1014. This enables the liquid contents of the container 600 to be pressurized (e.g., even still water may have nitrogen added to slightly "pump up" the container 600 or otherwise better enable to maintain its shape in the event of substantial impacts or external pressure. An external seal 1040 may also be present at a base 1042 of the cap 614 to keep a drinking surface (e.g., external surface 710) of the container 600 clean from contaminants.

FIGS. 11A-11D provide various views of the spiral-wound paper sleeve.

FIG. 12A is a side view of the polymeric body element 604 together with a perspective view of tooling 1210 configured to engage the external ribs 910 of the polymeric body element 604 during a spin welding operation. As shown, the tooling 1210 includes tool grooves 1220 for engaging the ribs 910 so as to prevent rotation of the body element 604 during spin welding. FIG. 12B shows a partially cutaway perspective view of the tooling 1210 when engaging the polymeric body element 604.

Figure 13B:
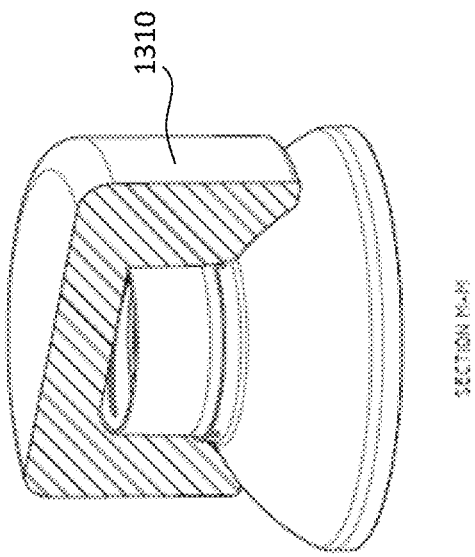
FIG. 13B is a perspective view of a top dome element and a partially cutaway perspective view of tooling engaging the top dome element to facilitate the spin welding operation.
Figure 13A:
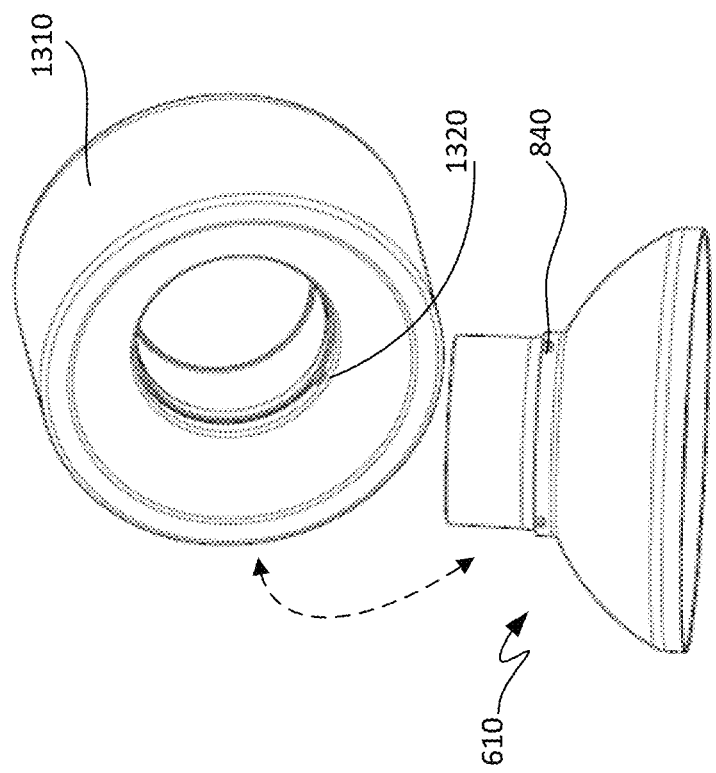
FIG. 13A shows bottom perspective views of a top dome element for a container and tooling configured to engage the top dome element during a spin welding operation.
Figure 15C:
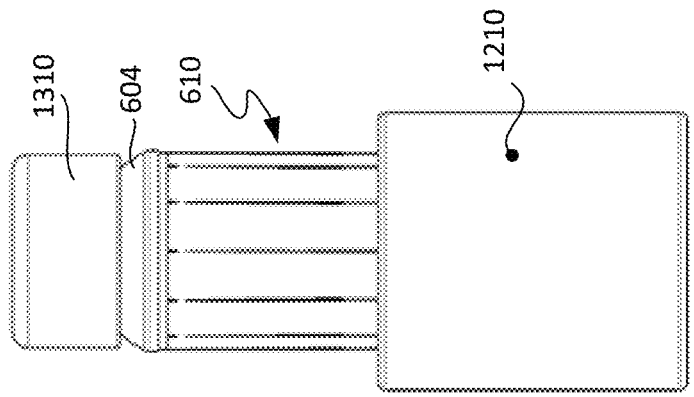
FIGS. 15B and 15C show opposite side views of the container and tooling of FIG. 15A with the polymeric top dome element and the polymeric body element welded together.
Figure 15B:
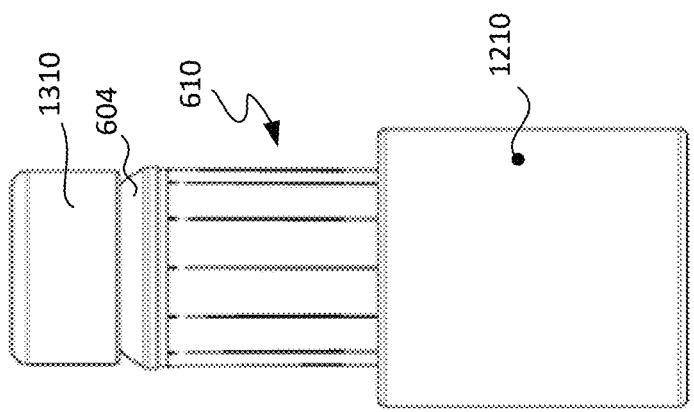
Figure 15A:
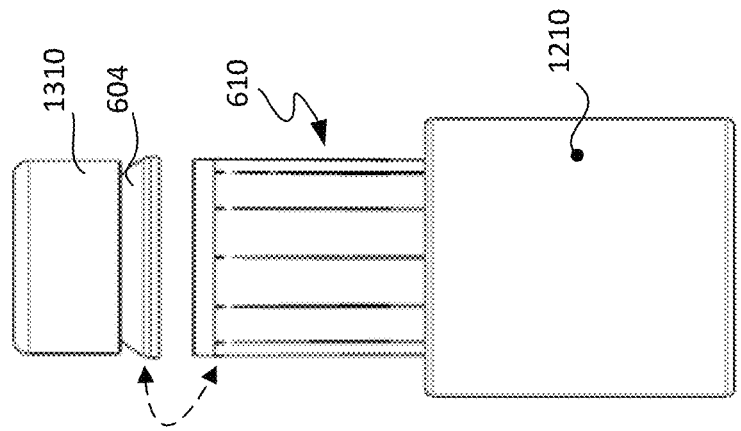
FIG. 15A is a partially disassembled side view of a container engaged by tooling configured to spin weld a polymeric top dome element of the container and a polymeric body element of the container.
Figure 16C:
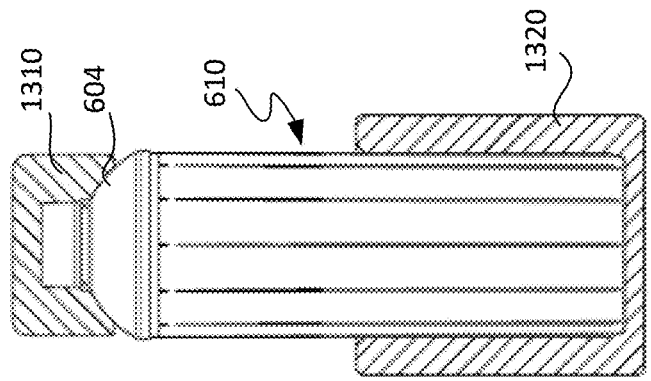
FIGS. 16B and 16C show opposite side and sectional views, respectively, of the capped container and tooling of FIG. 16A with the top dome element and the polymeric body element welded together.
Figure 16B:
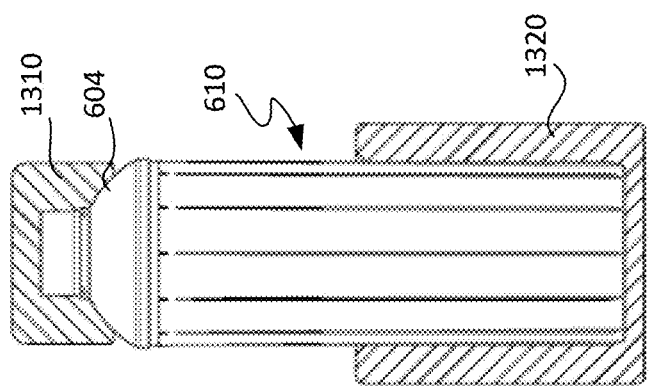
Figure 16A:
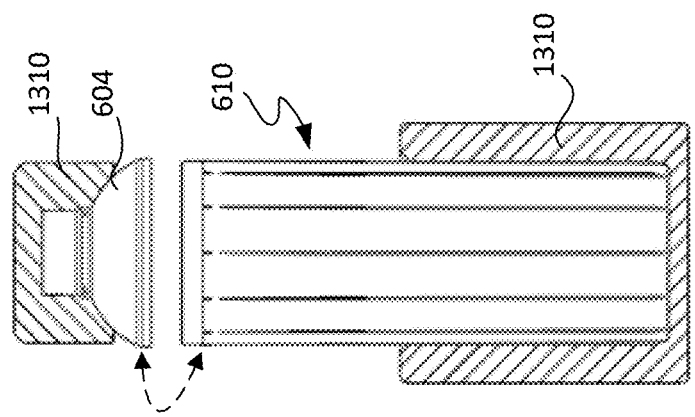
FIG. 16A is a partially disassembled side view of a capped container including a polymeric top dome element and a polymeric body element together with a sectional view of spin welding tooling engaging the container.
Figure 18C:
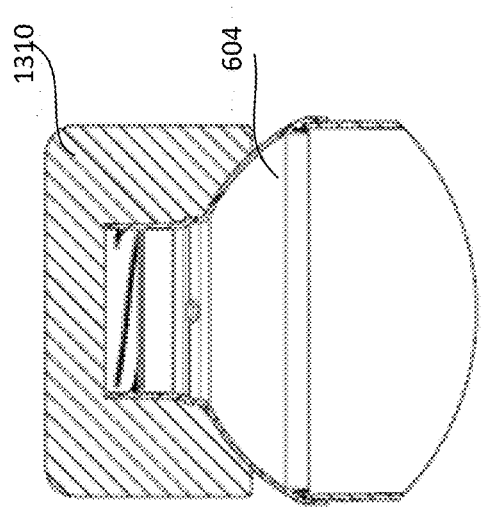
FIGS. 18A, 18B and 18C respectively illustrate the detail areas D1, D2 and D3 of FIGS. 17A, 17B and 17C.
Figure 18B:
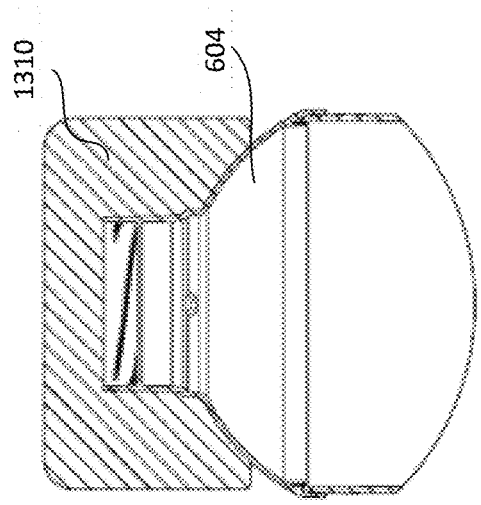
Figure 18A:
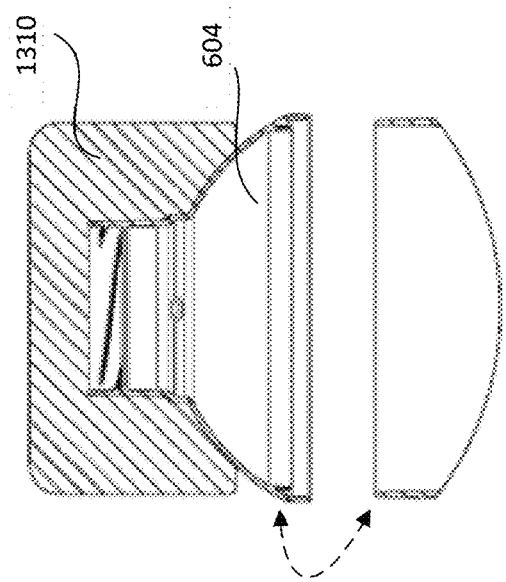

Attention is now directed to FIGS. 13 and 14, which illustrate the top dome element 610 and tooling 1310 for rotating the top dome element 610 during spin welding of the top dome element 610 and the body element 604. As shown, recesses 840 defined by a rim of the top dome element 610 are configured to be engaged by teeth 1320 of the tooling 1310 to prevent slippage during the spin welding process.

Turning now to FIGS. 15-18, various illustrations are provided of the top tooling 1310 and the bottom tooling 1210 respectively engaging the top dome element 610 and the body element 604 in connection with spin welding of these elements. In one embodiment the top tooling 1310 is configured for rotation and the bottom tooling 1210 is configured to hold the body element 604 in a fixed, non-rotating position. As is indicated by FIG. 15A, top tooling 1310 engages the top dome element 610 before pressing the top dome element 610 into contact with the body element 604 (FIG. 15B) and initiating spin welding. At this point a weld is formed by friction of the materials of the spinning top dome element 604 and fixed body element 604.

Figure 19B:
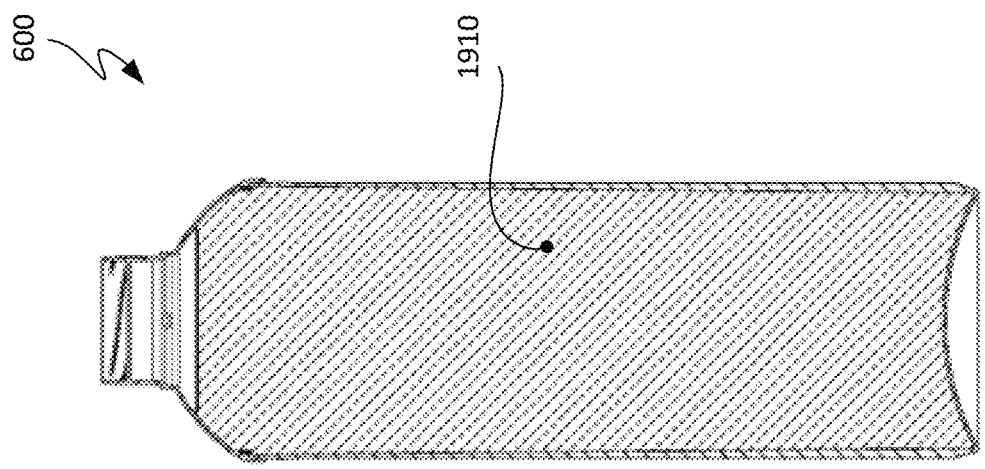
FIGS. 19A and 19B are sectional views of a biodegradable container in accordance with the disclosure when empty and filled with liquid, respectively.
Figure 19A:

FIGS. 19A and 19B are sectional views of the biodegradable container 600 when empty and filled with liquid 1910, respectively. FIG. 20 is a magnified sectional view of an upper portion of the filled biodegradable container 600 (FIG. 19B) with the cap 614 received by the cylindrical neck 704 of the top dome element 610.

Figure 21B:
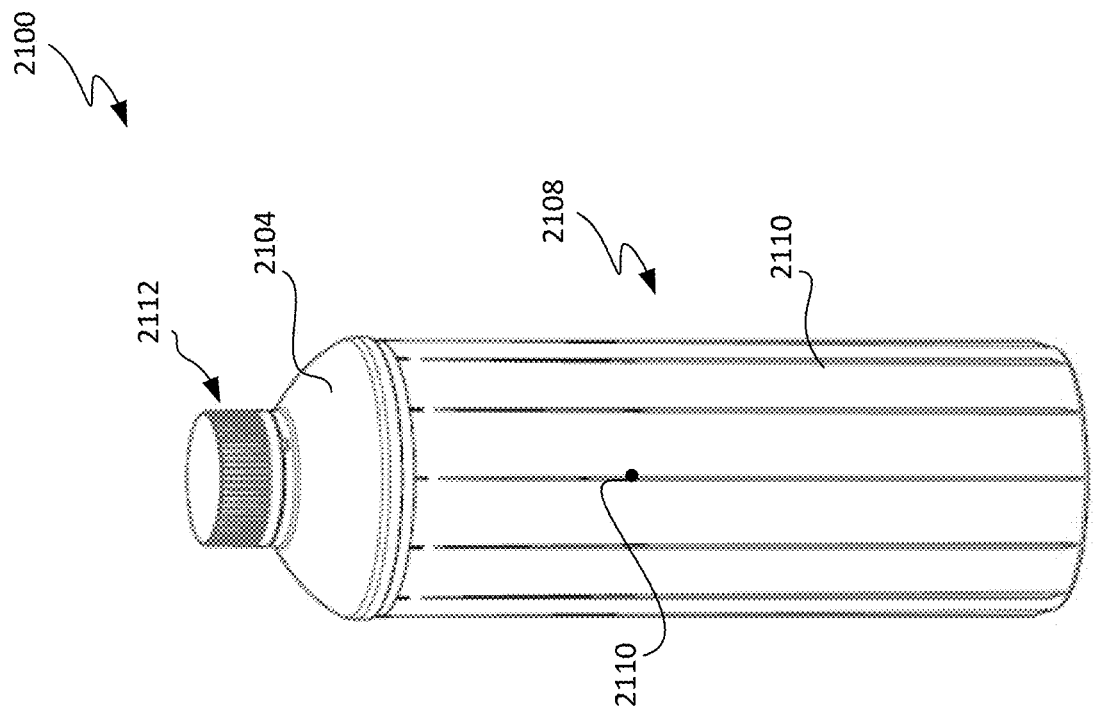
FIGS. 21A and 21B are partially disassembled and assembled perspective views, respectively, of a biodegradable container in accordance with the disclosure.
Figure 21A:
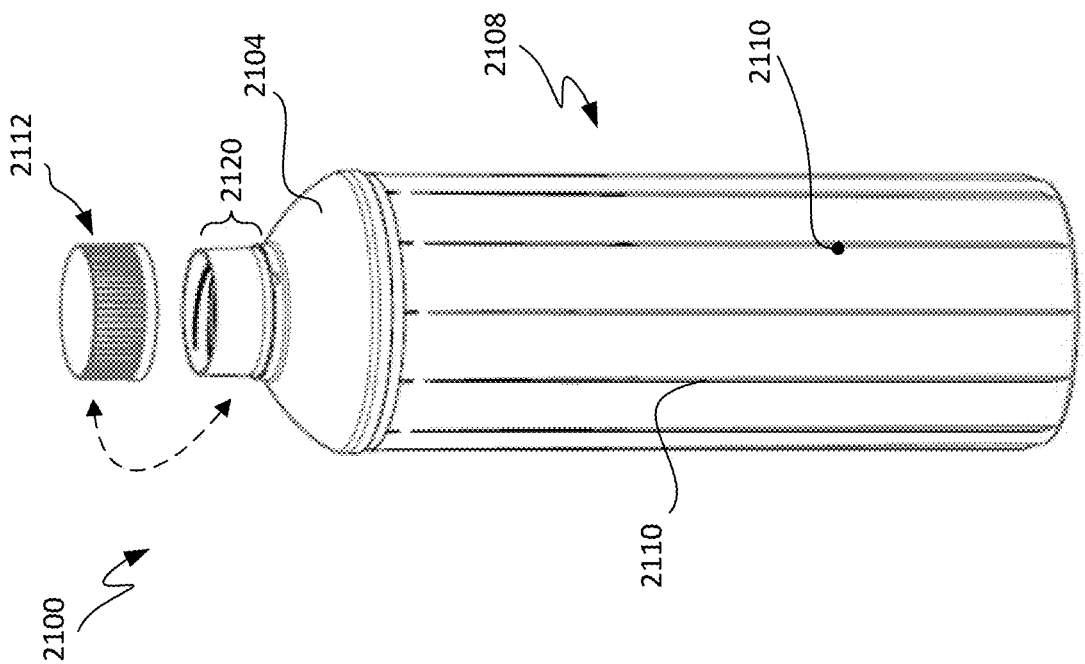

FIGS. 21A and 21B are partially disassembled and assembled perspective views, respectively, of a biodegradable container 2100 in accordance with the disclosure. In the embodiment of FIG. 21 the container 2100 includes a polymeric top dome element 2104 spin welded to a ribbed polymeric body element 2108. A polymeric cap 2112 engages with an internally-threaded neck portion 2120 of the top dome element 2104. In one implementation the polymeric top dome element 2104, ribbed polymeric body element 2108 and polymeric cap 2112 are substantially identical to the top dome element 610, body element 604 and cap 614 of FIG. 6 and the container 2100 may be formed through the spin welding process described above.

FIGS. 22A and 22B are side and sectional views, respectively, of the polymeric top dome element 2104 and the cap 2112. As shown in FIG. 22B, a rim of the top dome element 2104 defines an indentation 2210 for engaging tooling used during the process of spin welding the top dome element to the ribbed polymeric body element 2108.

Figure 23C:
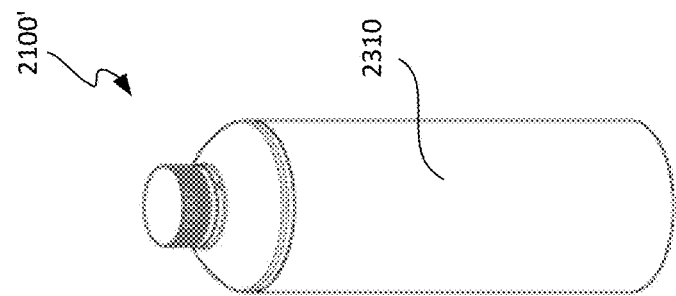
FIGS. 23A-23C illustrate stages in a process of inserting a partially assembled biodegradable container into a spiral wound paper sleeve of the container.
Figure 23B:
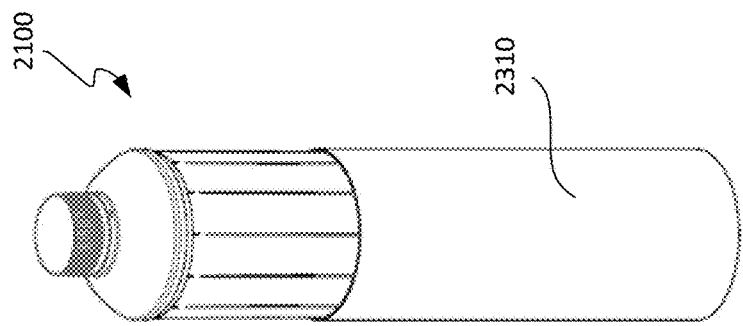
Figure 23A:
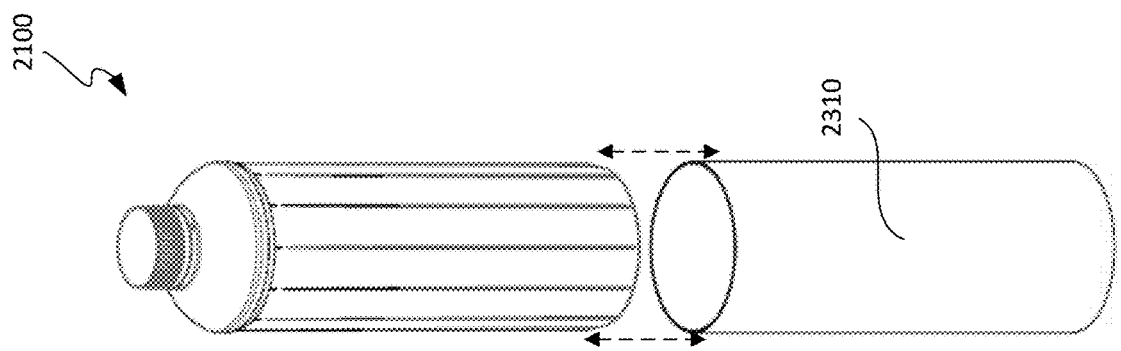
Figures 24A, 24B:
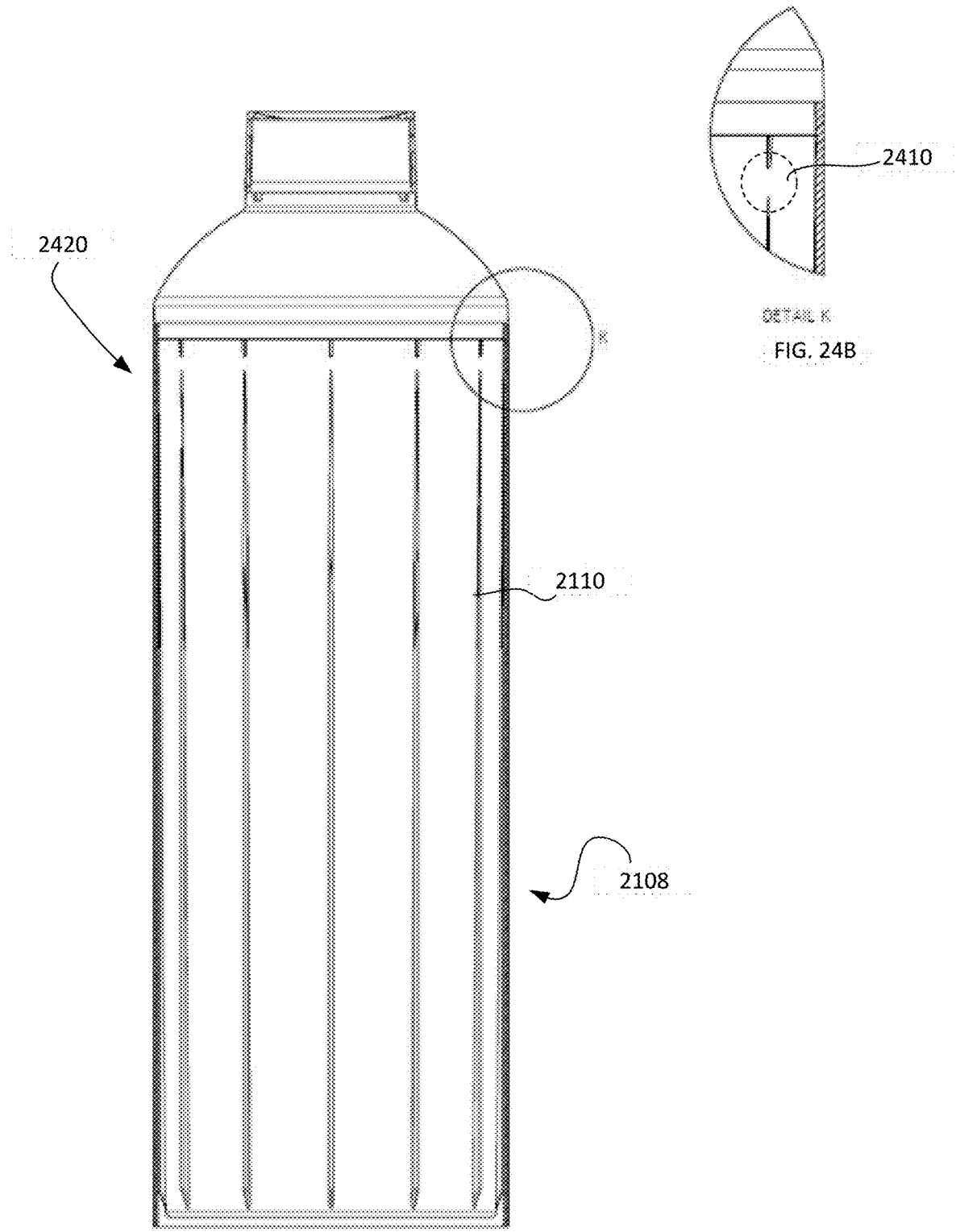
FIG. 24A illustrates a partially cutaway side view of a biodegradable container in accordance with the disclosure.
FIG. 24B depicts a portion of a polymeric body element of the biodegradable container of FIG. 24A configured with external ribs having notches for engaging a spiral wound sleeve enveloping the polymeric body element.

Although the container 2100 may be useful without an external sleeve, FIGS. 23-24 illustrate stages in a process of inserting the biodegradable container 2100 into a spiral wound paper sleeve 2310. The container 2100 is first placed in axial alignment with the sleeve 2310 and then inserted through an end of the sleeve 2310. The sleeve 2310 is then pushed upward against the ribs 2110. One or more of the ribs 2110 may define barbs 2410 for retaining the sleeve 2310 in place once its leading edge has been pushed to proximate a top end 2420 of the body element 2108, thereby yielding covered container 2100' (FIG. 23C).

Figure 25B:
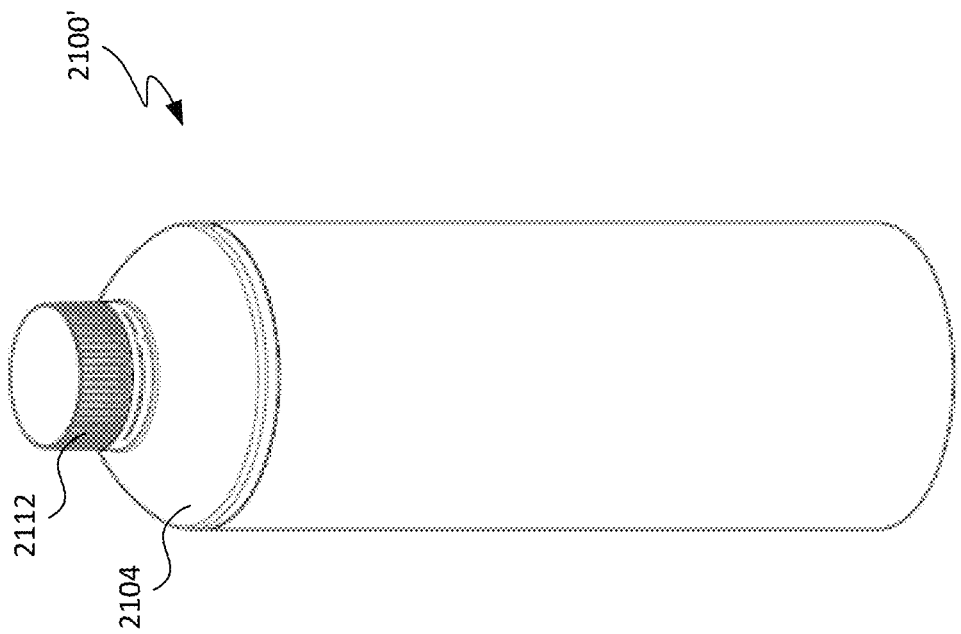
FIGS. 25A and 25B are perspective views of a biodegradable container that has been partially and completely, respectively, sealed with a tamper-evident seal.
Figure 25A:
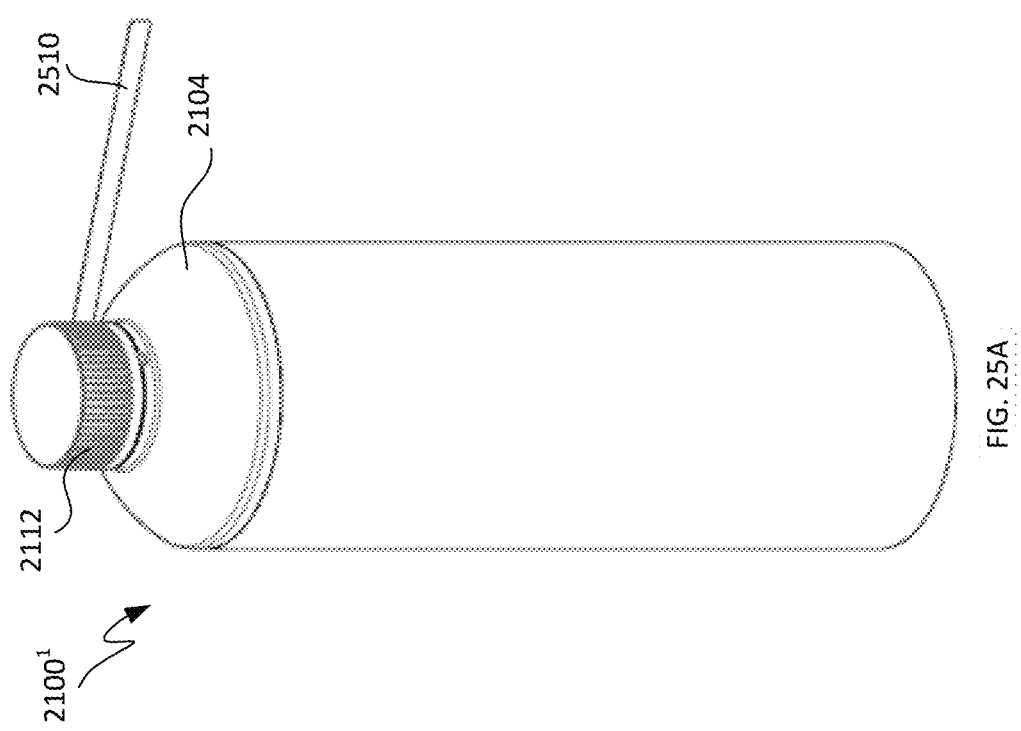

FIGS. 25A and 25B are perspective views of the container 2100 after having been partially and completely, respectively, sealed with a tamper-evident label 2510 designed to function as a security seal. In one embodiment the diameter of the cap 2112 and the diameter of the neck 2120 of the top dome element 2104 are substantially equal, allowing for the label 2510 to be placed across the joint between these elements. In one embodiment the label 2510 may be perforated or otherwise segmented across a midline so that it shears along such perforations when the cap 2112 is removed. Any adhesive added to the side of the label 2510 affixed to the container 2100' may be applied such that is not present over the joint between the cap 2112 and the neck 2120. The label 2510 can be applied easily by a rotational machine.

Figure 26E:
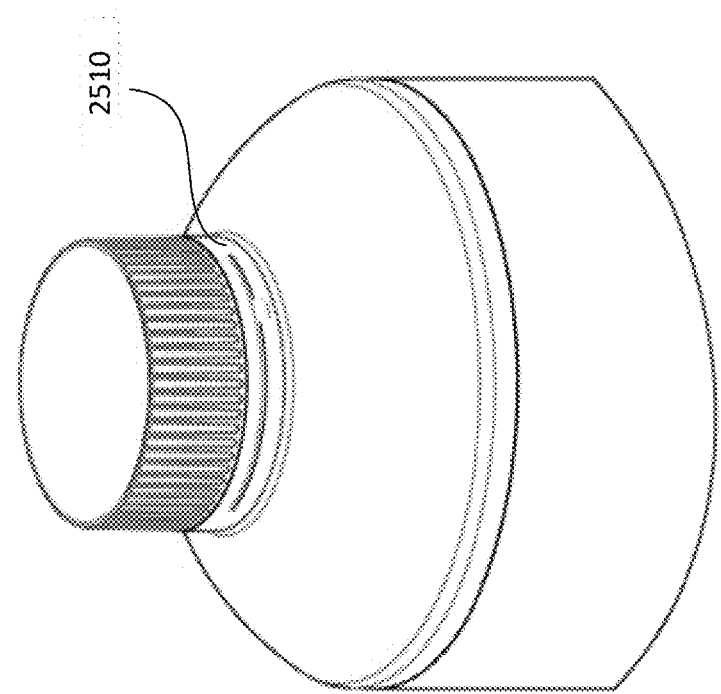
FIG. 26E illustrates an upper portion of a biodegradable container having a tamper-evident seal attached to a polymeric cap and a polymeric top dome element of the container.
Figure 26A:
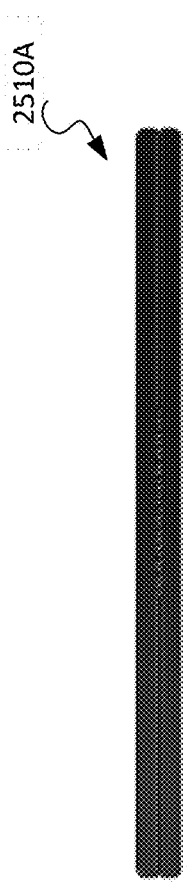
FIGS. 26A-26D illustrate different versions of a tamper-evident seal for a biodegradable container in accordance with the disclosure.
Figure 26B:
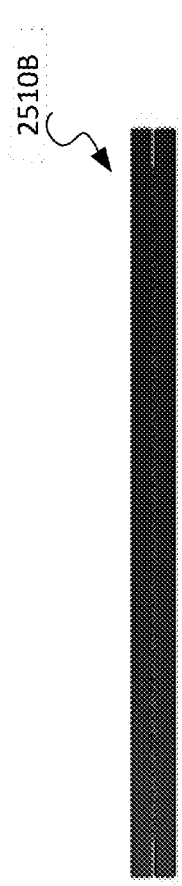
Figure 26C:
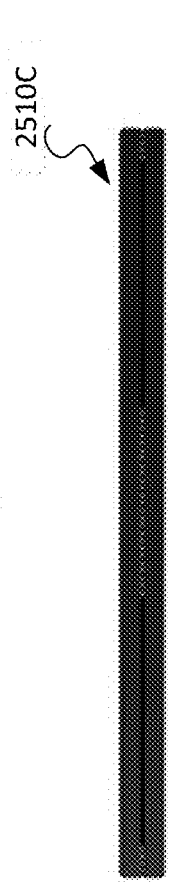
Figure 26D:
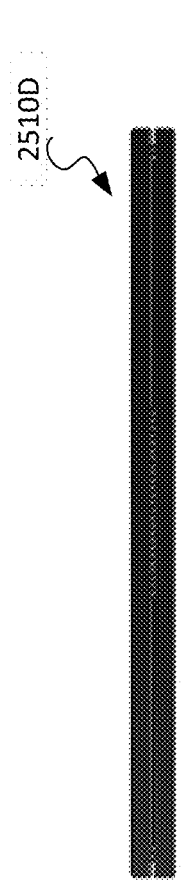
Figures 27A, 27B:
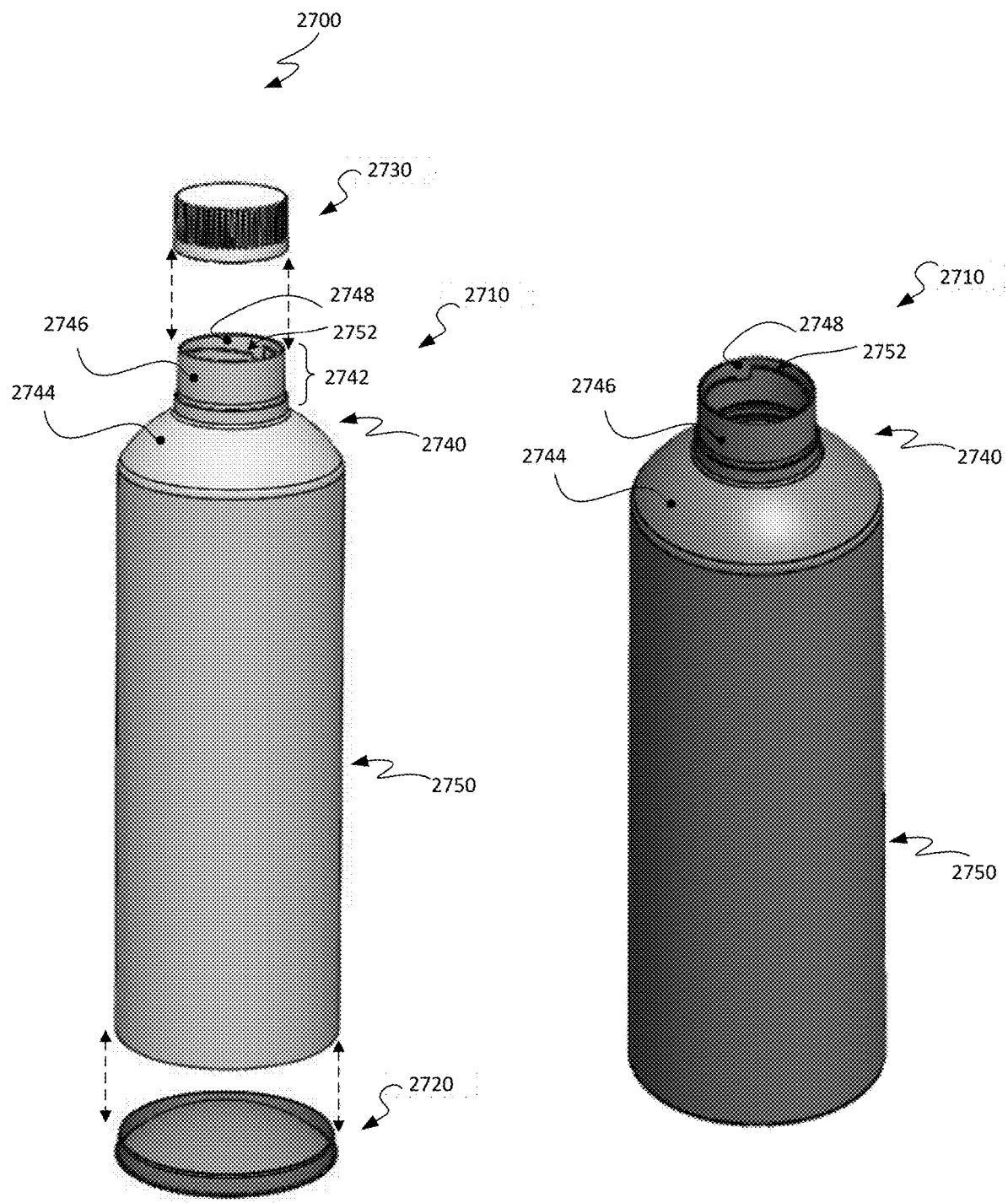
FIG. 27A is an exploded perspective view of a biodegradable container comprising a unitary polymeric body element, a bottom element and a polymeric cap in accordance with an embodiment.
FIG. 27B is a top perspective view of the unitary polymeric body element.

FIGS. 26A-26D illustrate different versions of the tamper-evident label 2510. FIG. 26E illustrates an upper portion of the biodegradable container 2100' with the tamper-evident label 2510 attached.

Attention is now directed to FIGS. 27-31, which illustrate a biodegradable container 2700 having a unitary polymeric body element designed to be manufactured simply and inexpensively. FIG. 27A is an exploded perspective view of an embodiment of the biodegradable container 2700. As shown, the embodiment of the biodegradable container comprises a unitary polymeric body element 2710, a bottom element 2720 and a polymeric cap 2730 in accordance with an embodiment. FIG. 27B is a top perspective view of the unitary polymeric body element 2710. As shown, the unitary polymeric body element 2720 includes a polymeric top dome portion 2740 contiguous with a cylindrical body portion 2750. The bottom element 2720 may be welded (e.g., sonic welded) to the cylindrical body portion 2750 of the unitary polymeric body element 2720. In one embodiment the biodegradable container is comprised primarily or exclusively of P-Hydroxy-Benzoate Hydroxylase (PHBH).

The polymeric top dome portion 2740 includes a cylindrical neck 2742 and a dome portion 2744. In one embodiment the wall thickness of the tope dome portion 2740 is made to be relatively thin in order to aid in its biodegradation. An external surface 2746 of the cylindrical neck 2742 forms a sealing face configured to be substantially flush with an inner surface of an external cover of the cap 2730. An internal surface 2748 of the cylindrical neck 2742 defines a tri-start internal thread 2752 configured to engage a thread defined by an inner rim of the cap 2730.

FIGS. 28A and 28B are a side view and a longitudinal sectional view, respectively, of an embodiment of the unitary polymeric body element 2710. FIG. 28C is a top view of the embodiment of the unitary polymeric body element 2710 of FIG. 28A.

FIGS. 29A-29F and 31A-31H provide various views of the cap 2730 included within the biodegradable container 2700. Specifically, FIG. 29A is a top view of the cap 2730. FIG. 29B is a top perspective view of the cap 2730. FIG. 29C is a bottom perspective view of the cap 2730. FIG. 29D is a partially cutaway side view of a first embodiment of the cap 27301. As is described more fully below, FIG. 29E is a partially cutaway side view of a second embodiment of the cap 27302 having a tapered sealing face. FIG. 29F is a bottom view of the cap 2730.

FIG. 31A is a side view of the cap 2730. FIG. 31A is a side sectional view of the cap 2730. FIG. 31C is a magnified view of a portion of the cap 2730 defining tri-start threads 2914. FIG. 31D is a bottom view of the cap 2730. FIG. 31E is a bottom view of the cap 2730. FIG. 31F is a longitudinal sectional view of the second embodiment of the cap 27302. FIG. 31G is an inverted and partially transparent perspective view of the second embodiment of the cap 27302. FIG. 31H is a transverse sectional view of the second embodiment of the cap 27302.

Figure 30B:
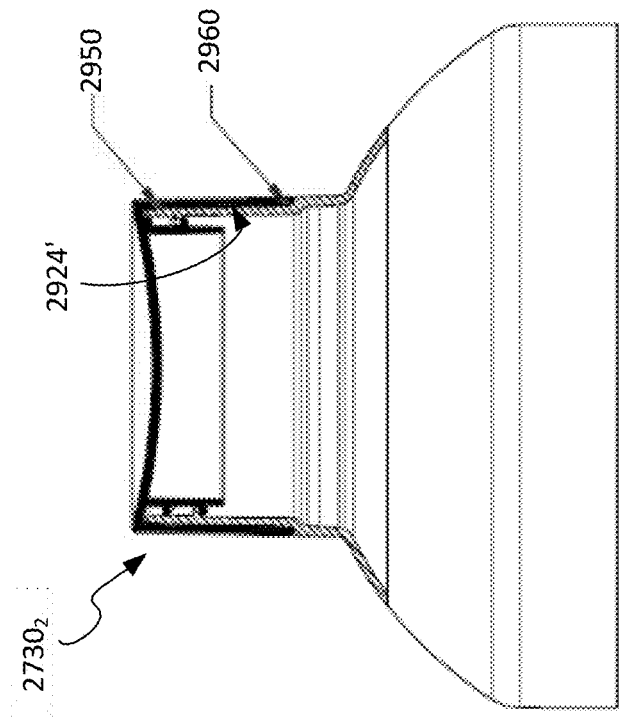
FIG. 30B is a side sectional view of an embodiment of the biodegradable container of FIG. 27A utilizing the second embodiment of the cap of the cap.
Figure 30A:
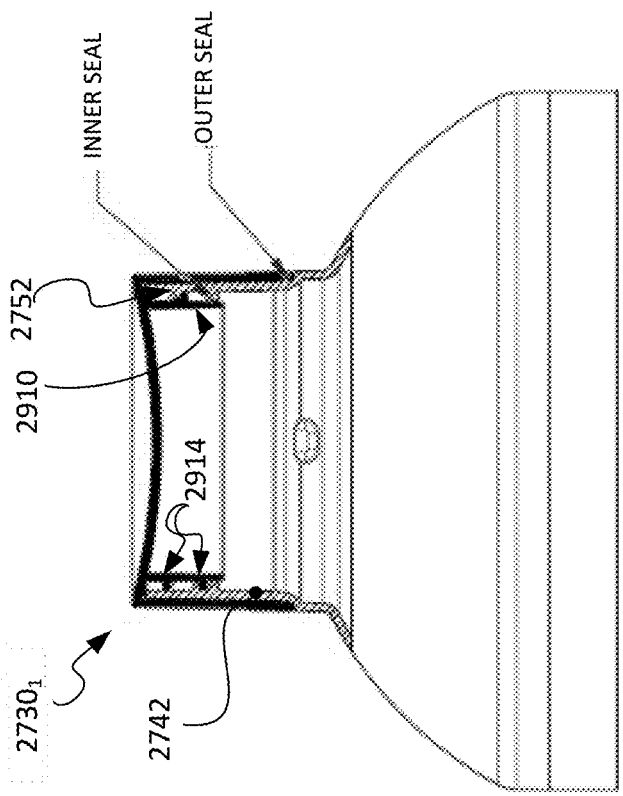
FIG. 30A is a side sectional view of an embodiment of the biodegradable container of FIG. 27A utilizing the first embodiment of the cap.

FIG. 30A is a side sectional view of an embodiment of the biodegradable container 2700 utilizing the first embodiment of the cap of the cap 27301. As shown, the internal rim 2910 of the cap 27301 defines a tri-start thread 2914. When the cap 27301 is received by the neck 2742 of the polymeric top dome portion 2740, the thread 2914 engages the tri-start internal thread 2752 of the neck 2742. In addition, when the cap 27301 is in a closed position an inner surface 2924 of the cover 2920 covers an external surface 2746 of the cylindrical neck 2742.

The external cover 2920 also defines a plurality of recesses 2930, i.e., sections of reduced wall thickness substantially perpendicular to a base 2942 of the cap 27301. These reduced-thickness recesses 2930 aid in biodegradation and provide a grip for opening and closing the container 2900 using the cap 2720. In one embodiment a nominal wall thickness within the recesses 2930 is 0.75 mm with a nominal draft of 0.5°.

In one embodiment the cap 2720 seals on the internal rim 2910 below the thread 2752. This enables the liquid contents of the container 2700 to be pressurized (e.g., even still water may have nitrogen added to slightly "pump up" the container 2700 or otherwise better enable to maintain its shape in the event of substantial impacts or external pressure.

FIG. 30B is a side sectional view of an embodiment of the biodegradable container 2700 utilizing the second embodiment of the cap of the cap 27302. In the embodiment of FIG. 30B, an inner surface 2924' of the cover 2920 forms a tapered sealing face that forms an inner seal 2950 with an upper portion of the external surface 2746 of the cylindrical neck 2742 when the cap 27302 is in a closed position. This inner seal ensures liquid is retained within the container 2700 and enables the liquid contents of the container 2700 to be pressurized. In addition, the inner surface 2924' of the cover 2920 forms an outer seal 2960 with a lower portion of the external surface 2746 of the cylindrical neck 2742 when the cap 27302 is in the closed position. The outer seal prevents contaminants from entering the container 2700.

One advantage of the embodiment of FIG. 30B is that the cap 27302 can be made from a simplified injection molding process that does not require tooling to perform an unscrewing function in connection with forming the thread 2914. Since no unscrewing mechanism or machinery is required to be introduced into the manufacturing process, the thread 2914 can be created by using hot tips to injected the polymer being used along a path defined by tooling along the outer surface of internal rim 2910. Since in the embodiment of FIG. 30B sealing is effected by contact between the inner surface 2924' and the surface 2746 of the cylindrical neck 2742, the thread 2914 can be attenuated and need not form a shelf or other surface to seal with a corresponding thread or other surface defined by the cylindrical neck 2742.

Figures 32A, 32B:
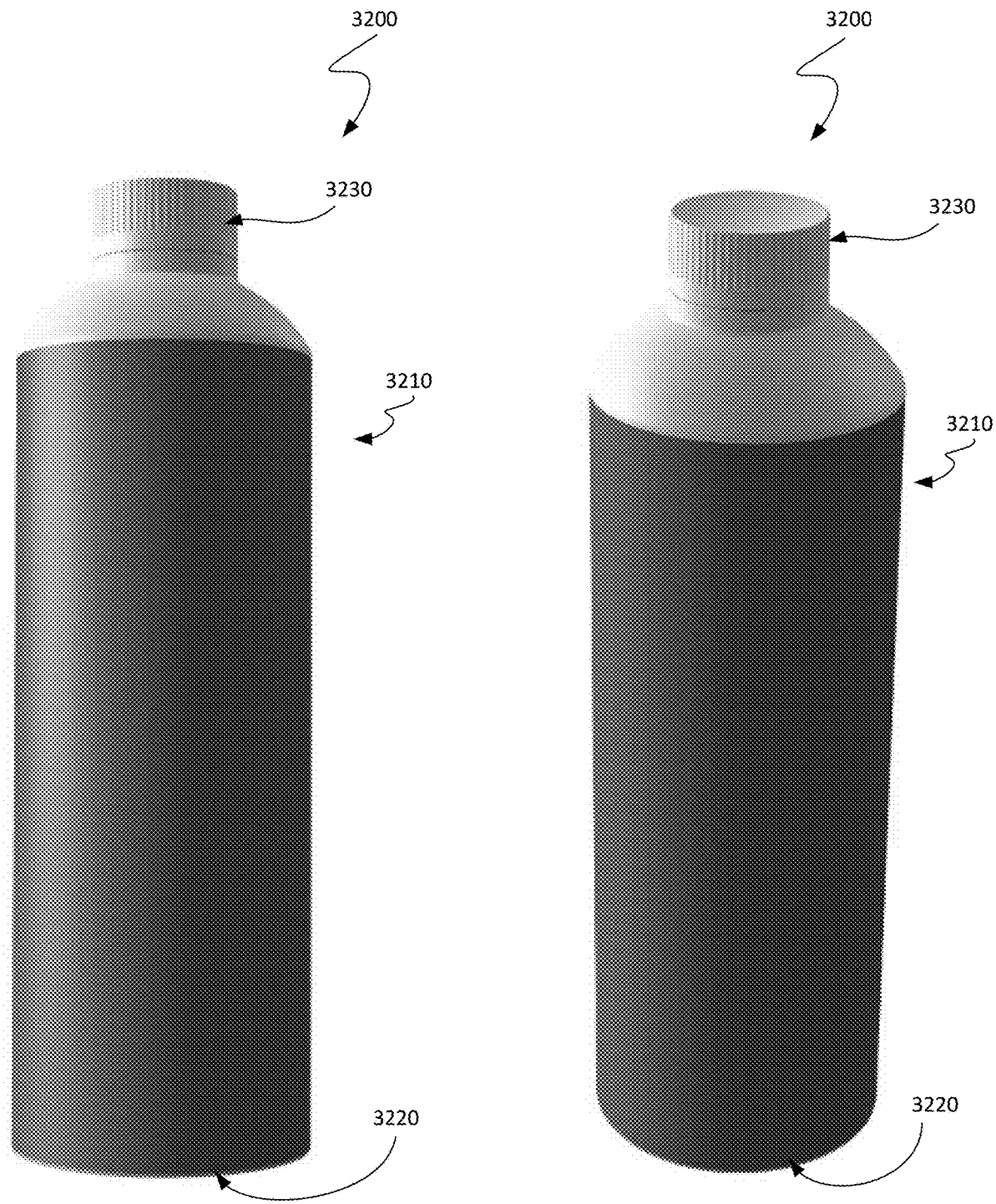
FIG. 32A is a side view of a biodegradable container in accordance with an embodiment.
FIG. 32B is a side perspective view of the biodegradable container of FIG. 32A.
Figure 32C:
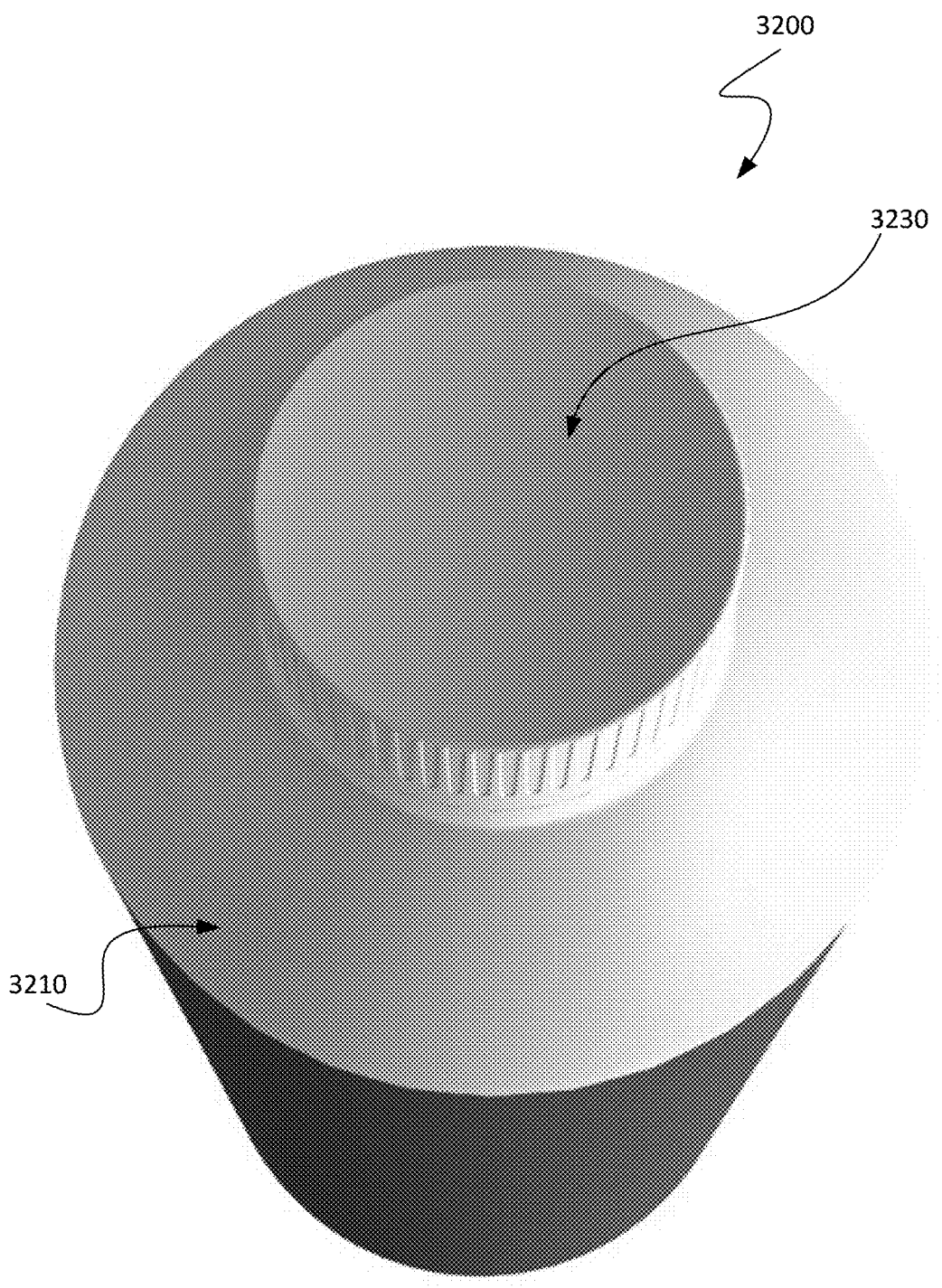
FIG. 32C is a top perspective view of the biodegradable container of FIG. 32A.
Figure 32D:
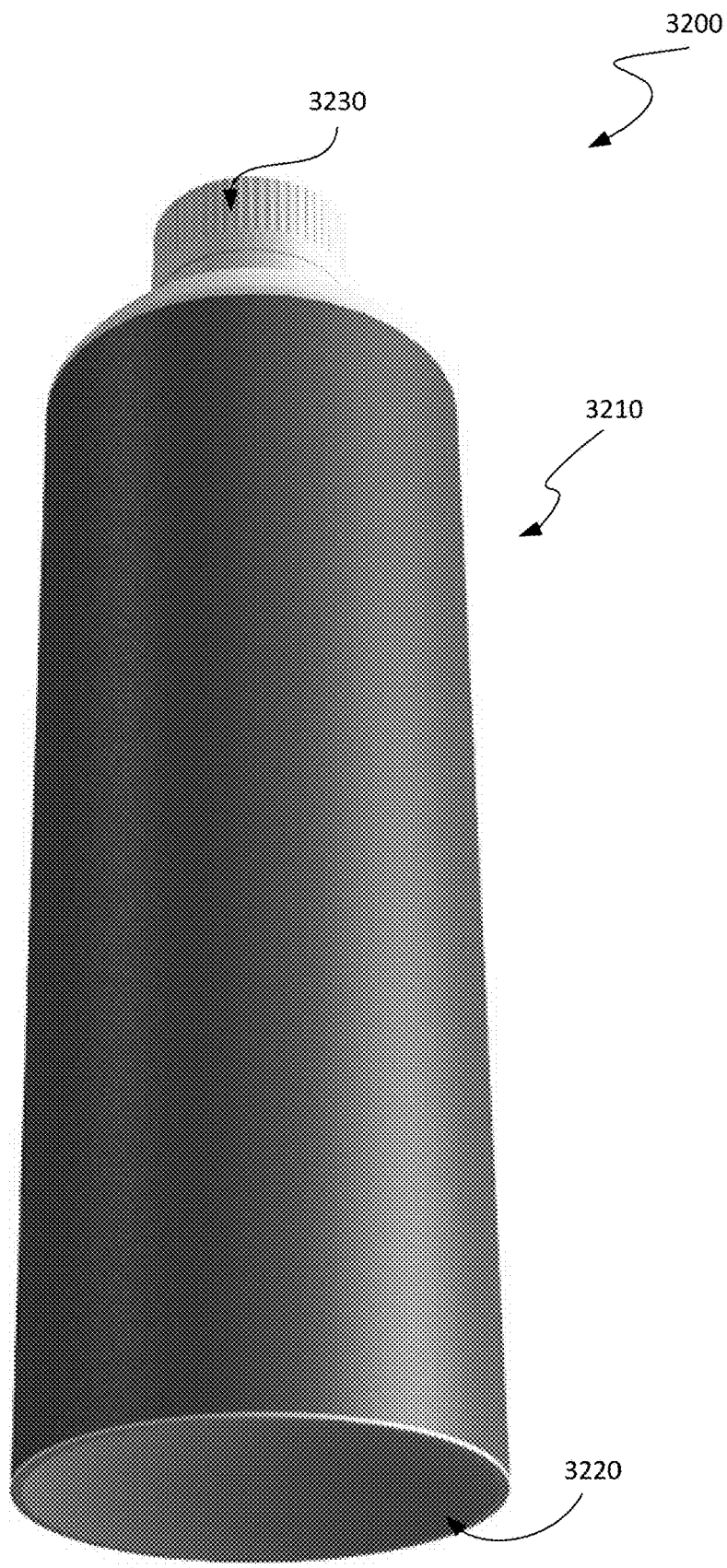
FIG. 32D is a bottom perspective view of the biodegradable container of FIG. 32A.
Figure 32E:
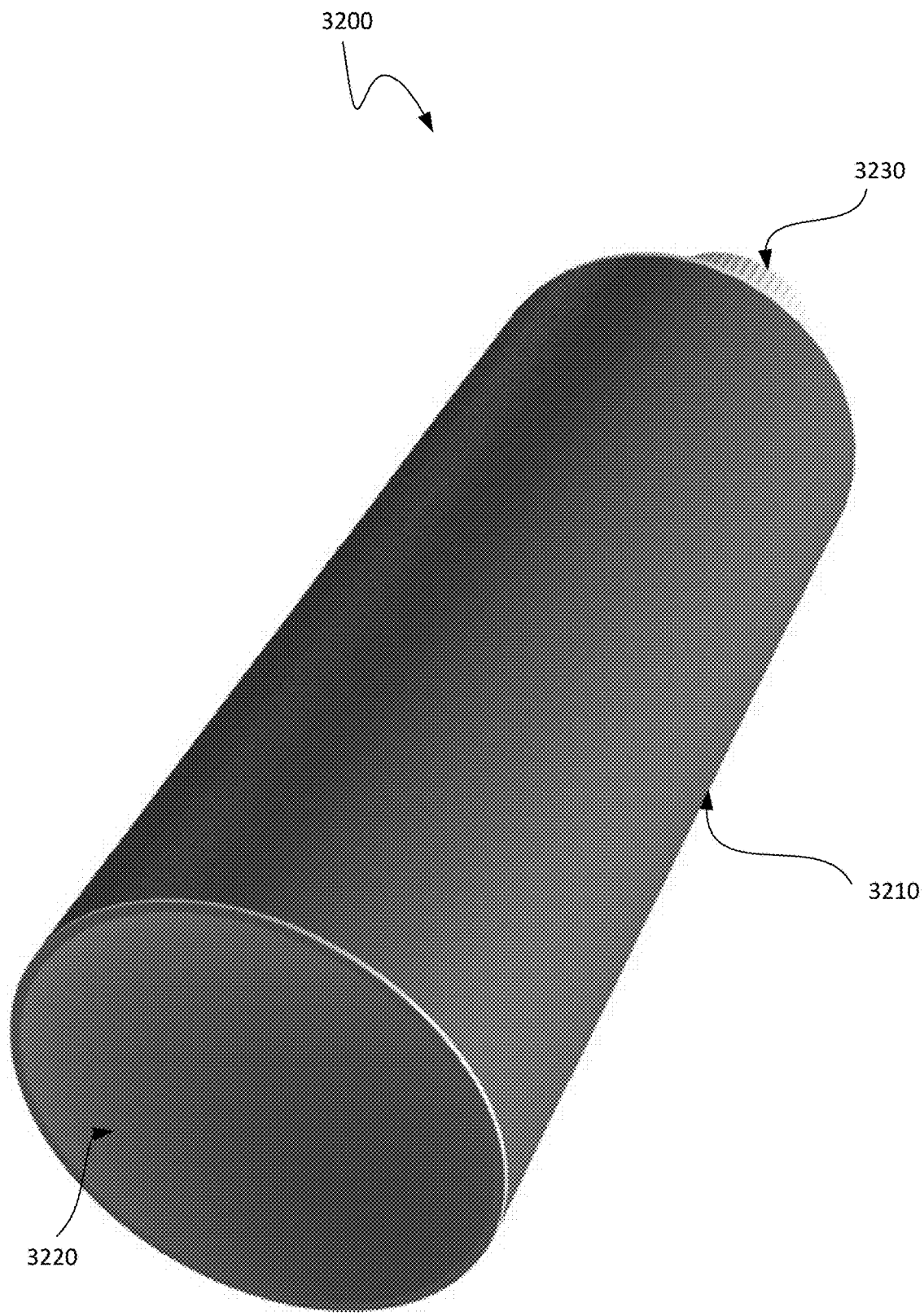
FIG. 32E is an alternate bottom perspective view of the biodegradable container of FIG. 32A.
Figure 32F:
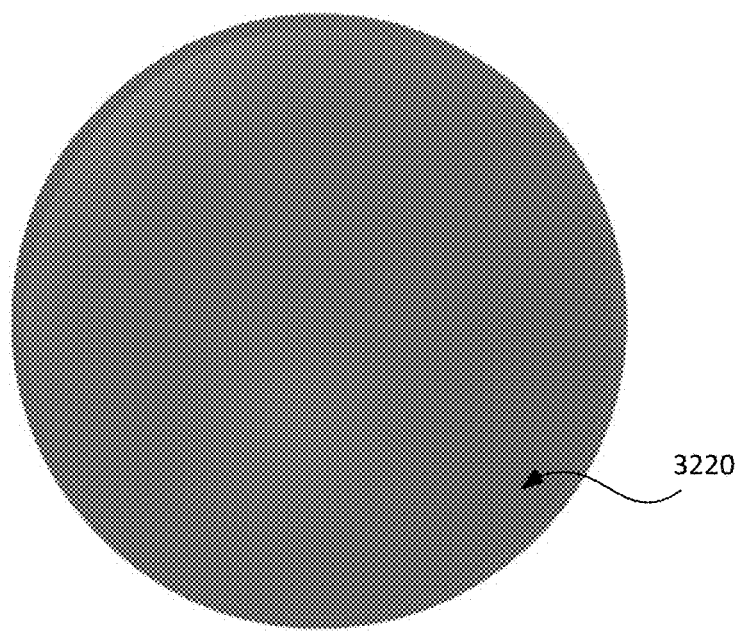
FIG. 32F is a bottom view of the biodegradable container of FIG. 32A.
Figure 32G:
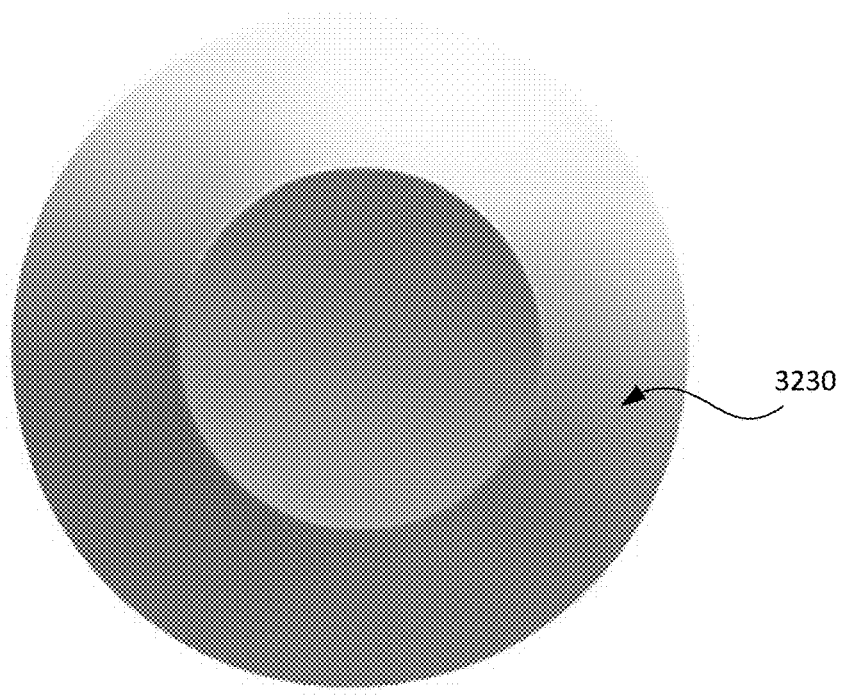
FIG. 32G is a top view of the biodegradable container of FIG. 32A.

FIGS. 32A-32G are various external views of a biodegradable container 3200 in accordance with the disclosure. The biodegradable container 3200 includes a unitary polymeric body element 3210, a bottom element 3220 and a polymeric cap 3230 in accordance with an embodiment. FIG. 32A is a side view of the biodegradable container 3200; FIG. 32B is a side perspective view of the biodegradable container 3200; FIG. 32C is a top perspective view of the biodegradable container 3200; FIG. 32D is a bottom perspective view of the biodegradable container 3200; FIG. 32E is an alternate bottom perspective view of the biodegradable container 3200; FIG. 32F is a bottom view of the container 3200; and FIG. 32G is a top view of the biodegradable container 3200.

Figures 33A, 33B:
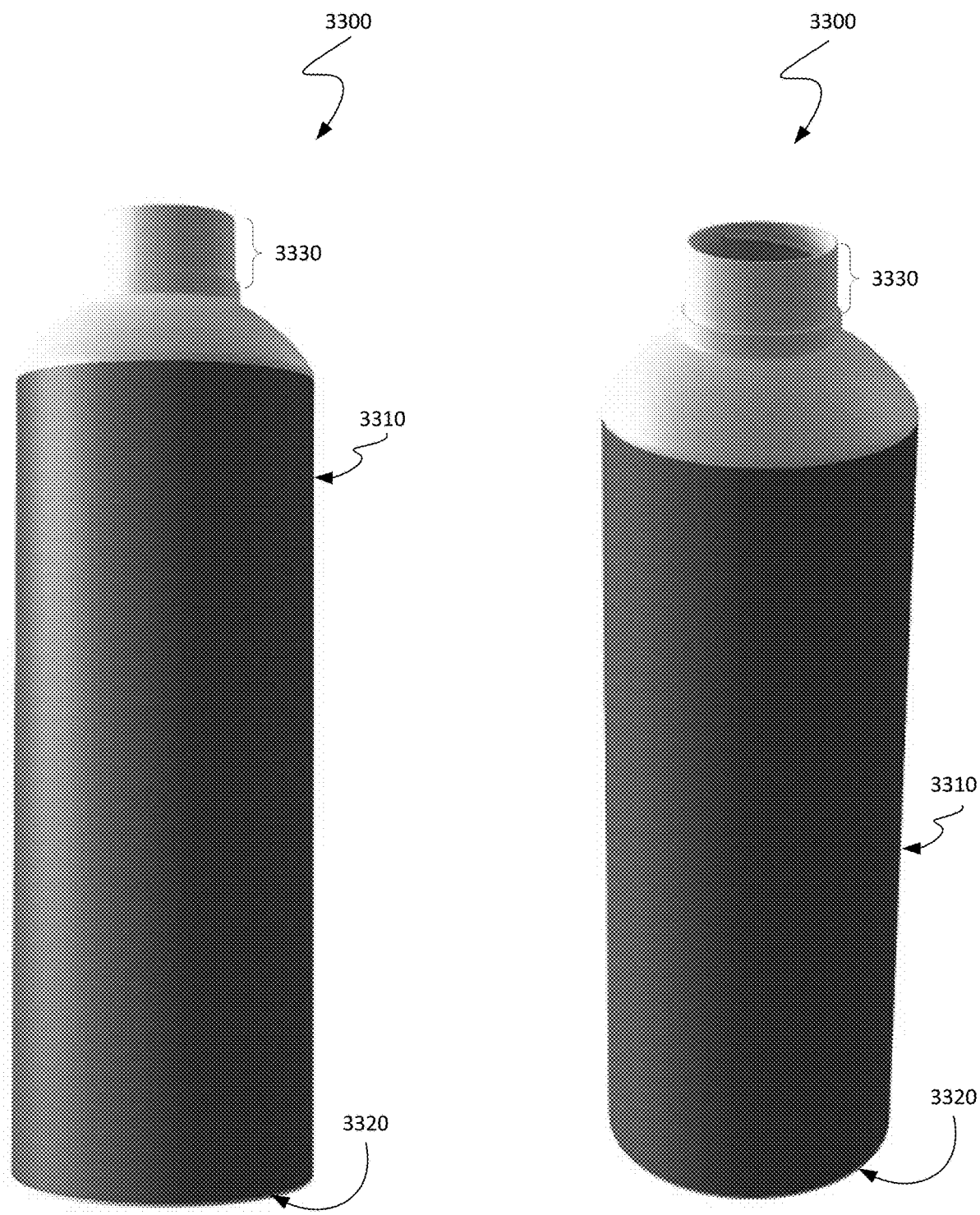
FIG. 33A is a side view of a biodegradable container in accordance with an embodiment.
FIG. 33B is a side perspective view of the biodegradable container of FIG. 33A.
Figure 33C:
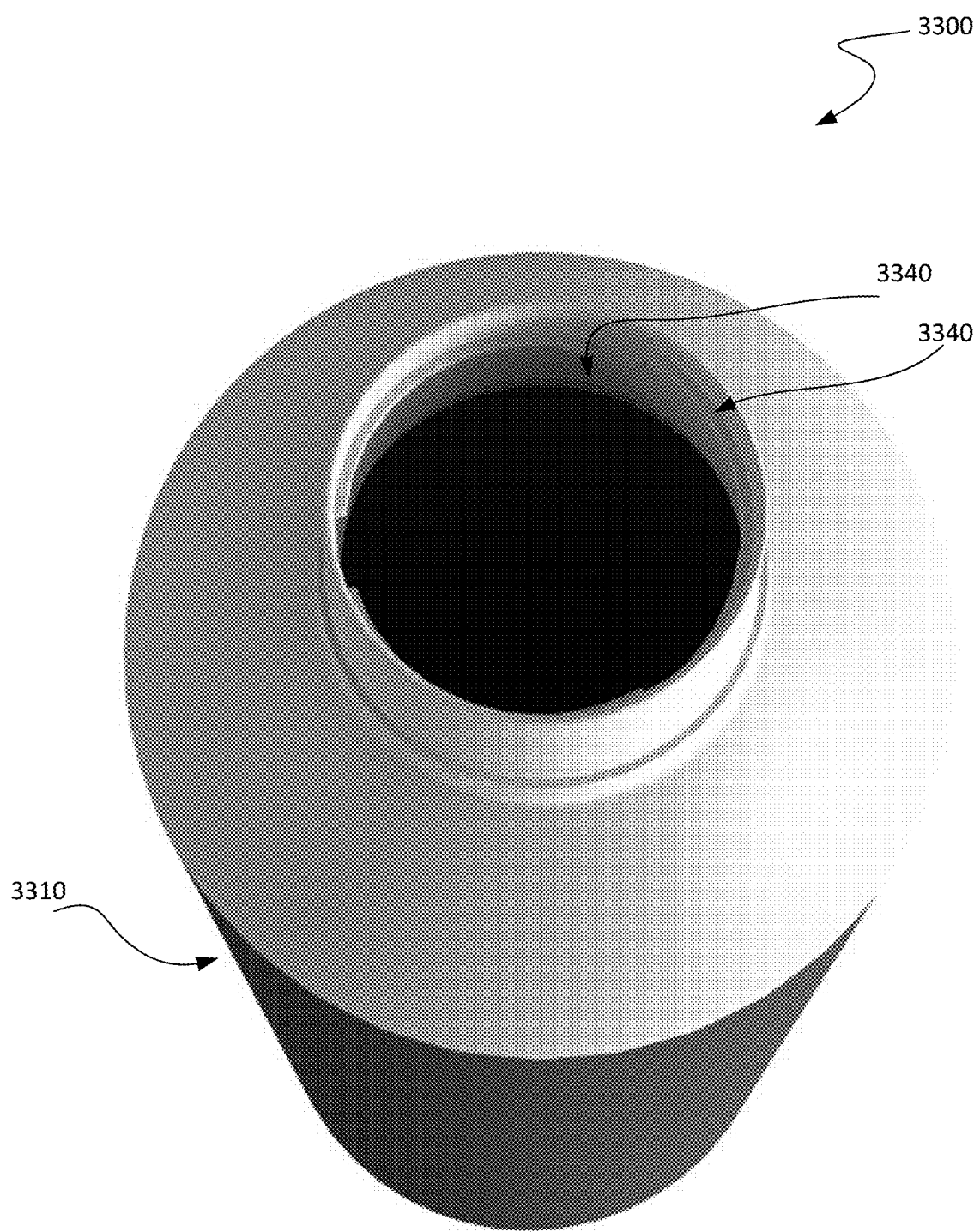
FIG. 33C is a top perspective view of the biodegradable container of FIG. 33A.
Figure 33D:
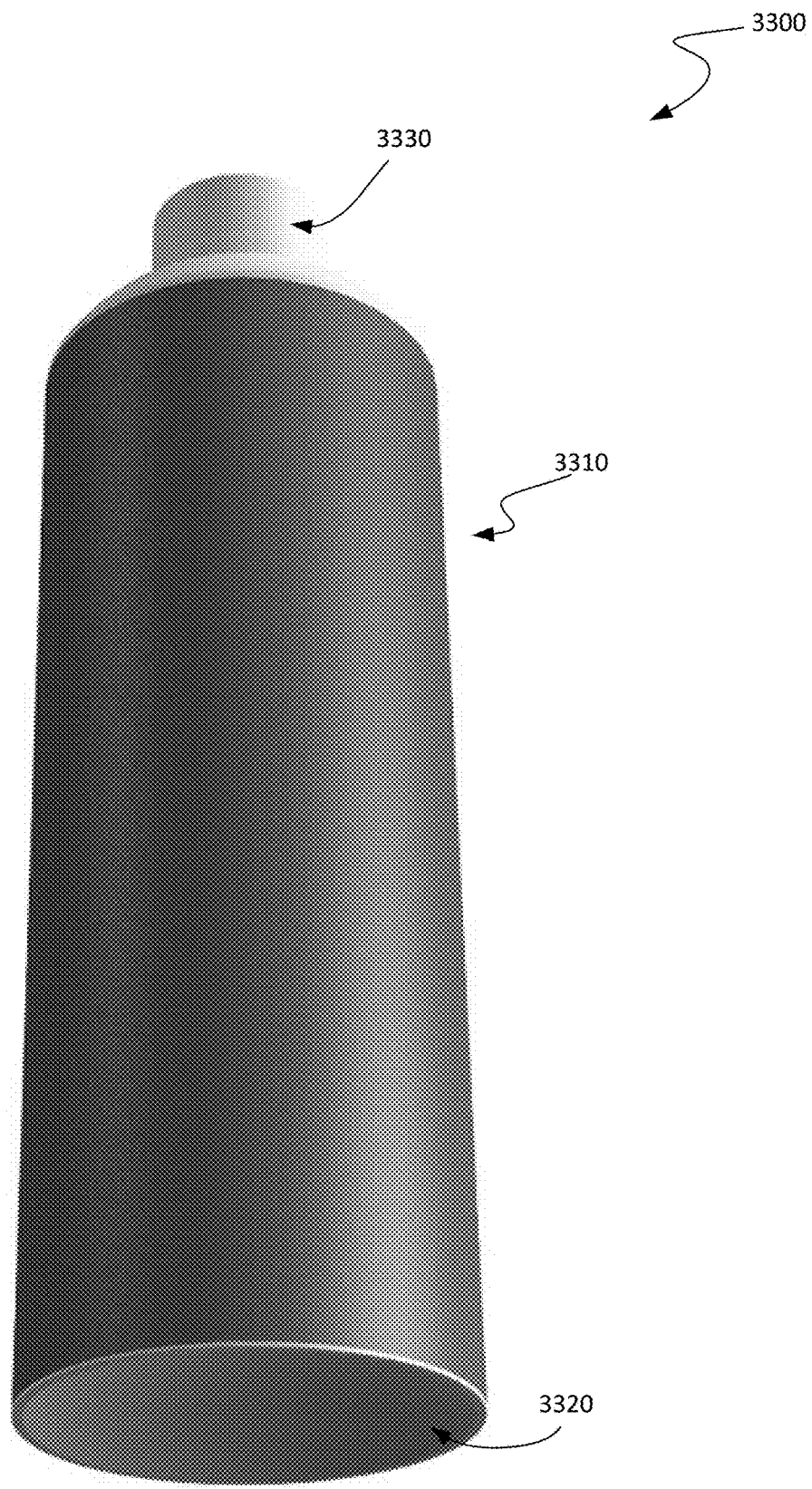
FIG. 33D is a bottom perspective view of the biodegradable container of FIG. 33A.
Figure 33E:
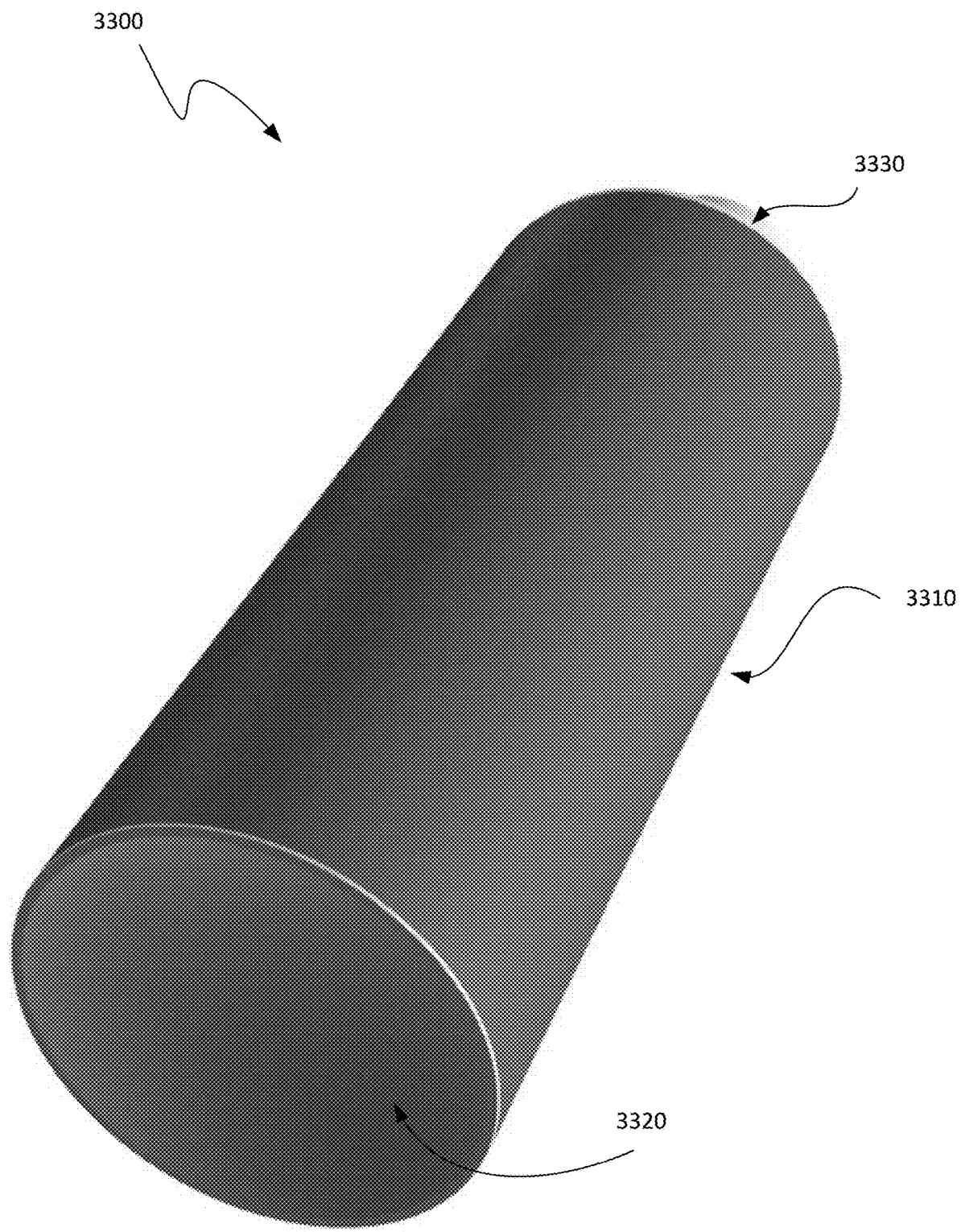
FIG. 33E is an alternate bottom perspective view of the biodegradable container of FIG. 33A.
Figure 33F:
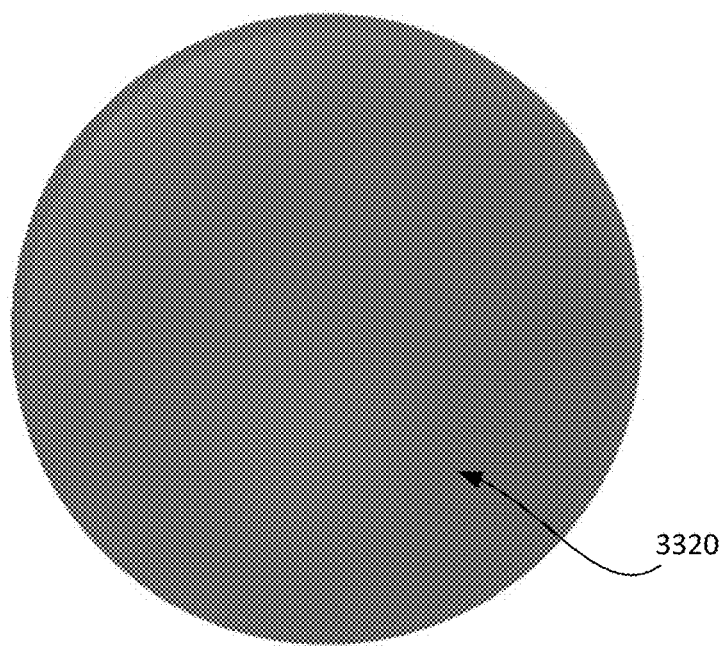
FIG. 33F is a bottom view of the biodegradable container of FIG. 33A.
Figure 33G:
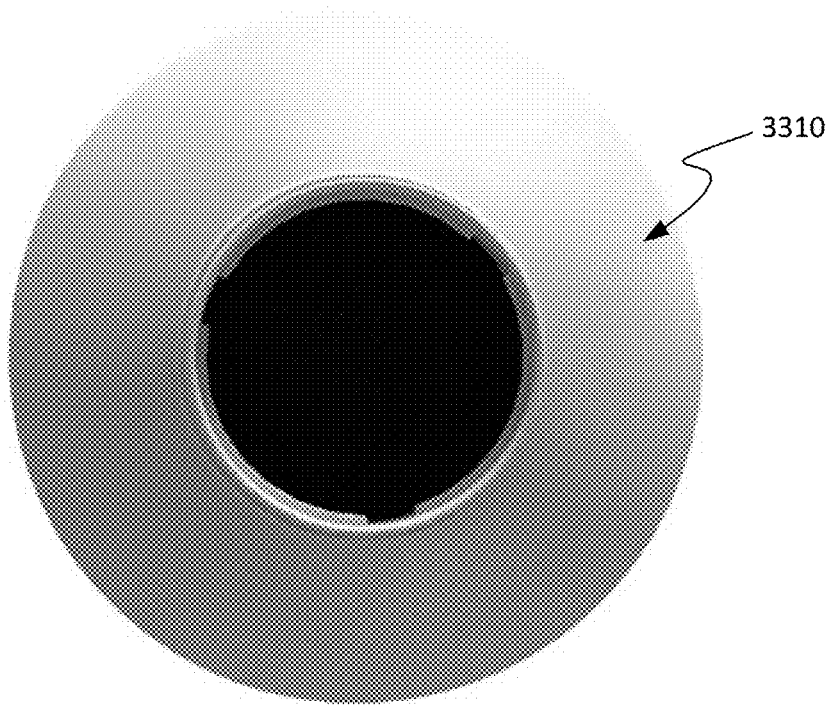
FIG. 33G is a top view of the biodegradable container of FIG. 33A.

FIGS. 33A-33G are various external views of a biodegradable container 3300 in accordance with the disclosure. The biodegradable container 3300 includes a unitary polymeric body element 3310 and a bottom element 3320. The unitary polymeric body element 3310 defines a neck portion 3330 having internal threads 3340 configured to receive a polymeric cap (not shown). FIG. 33A is a side view of the biodegradable container 3300; FIG. 33B is a side perspective view of the biodegradable container 3300; FIG. 33C is a top perspective view of the biodegradable container 3300; FIG. 33D is a bottom perspective view of the biodegradable container 3300; FIG. 33E is an alternate bottom perspective view of the biodegradable container 3300; FIG. 33F is a bottom view of the container 3300; and FIG. 33G is a top view of the biodegradable container 3300.

While various embodiments have been described above, it should be understood that they have been presented by way of example only, and not limitation. They are not intended to be exhaustive or to limit the claims to the precise forms disclosed. Indeed, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated.

Where methods described above indicate certain events occurring in certain order, the ordering of certain events may be modified. Additionally, certain of the events may be performed concurrently in a parallel process when possible, as well as performed sequentially as described above. Accordingly, the specification is intended to embrace all such modifications and variations of the disclosed embodiments that fall within the spirit and scope of the appended claims.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A biodegradable container, comprising:
   a cylindrical polymeric body element defining an outer cylindrical surface;
   a polymeric top dome element including a dome portion and a cylindrical neck, the dome portion having a top and a bottom wherein the bottom includes a sealing rim designed to prevent contaminates from entering an interior of the biodegradable container and wherein the sealing rim abuts an upper portion of the outer cylindrical surface, the bottom of the dome portion being spin welded to the cylindrical polymeric body element, the cylindrical neck defining an inner surface and an outer surface wherein the top of the dome portion defines indentations configured to engage tooling for spin welding of the bottom of the dome portion to the cylindrical polymeric body element;
   a paper sleeve surrounding the cylindrical polymeric body element; and
   a polymeric cap defining an internal rim configured to be received by the inner surface of the cylindrical neck wherein the polymeric cap includes an outer cylindrical cover configured to extend over the outer surface of the cylindrical neck and wherein the outer surface of the cylindrical neck is smooth and forms a uniform sealing face configured to be substantially flush with an interior surface of the outer cylindrical cover.

2. The biodegradable container of claim 1 wherein the cylindrical polymeric body element is injection-molded and defines a set of exterior ribs extending from a circumference defined by an external surface of a body of the cylindrical polymeric body element, the paper sleeve being supported by the set of exterior ribs.

3. The biodegradable container of claim 2 wherein a draft angle associated with the external surface of the body is 0.5° or less.

4. The biodegradable container of claim 3 wherein the set of exterior ribs are parallel to a longitudinal axis of the biodegradable container.

5. The biodegradable container of claim 2 wherein one or more of the set of exterior ribs each define a barb to retain the paper sleeve.

6. The biodegradable container of claim 1 wherein a surface of the internal rim defines threads configured to engage corresponding threads defined by the inner surface of the cylindrical neck.

7. The biodegradable container of claim 1 further including a tamper-evident label affixed to an exterior surface of the cylindrical neck and an exterior surface of the polymeric cap.

8. The biodegradable container of claim 1 further including a seal between a surface of the internal rim and the inner surface of the cylindrical neck wherein a base of the outer cylindrical cover abuts an upper part of the dome portion.

9. The biodegradable container of claim 1 wherein the dome portion further includes an inner rim containing welding flash.

10. A biodegradable container, comprising:
    a cylindrical polymeric body element having a body defining an inner cylindrical surface and on outer cylindrical surface wherein a set of exterior ribs are defined on the outer cylindrical surface;
    a polymeric top dome element including a dome portion and a cylindrical neck, the dome portion being joined to the cylindrical polymeric body element and the cylindrical neck defining an inner surface and an outer surface;
    wherein a bottom of the dome portion includes a sealing rim abutting an upper portion of the outer cylindrical surface, the sealing rim being designed to prevent contaminates from entering an interior of the biodegradable container;
    wherein a top of the dome portion defines indentations configured to engage tooling for spin welding of the bottom of the dome portion to the cylindrical polymeric body element;
    a paper sleeve supported by the set of exterior ribs; and
    a polymeric cap defining an internal rim configured to be received by the inner surface of the cylindrical neck wherein the polymeric cap includes an outer cylindrical cover configured to extend over the outer surface of the cylindrical neck and wherein the outer surface of the cylindrical neck is smooth and forms a uniform sealing face configured to be substantially flush with an interior surface of the outer cylindrical cover.

11. The biodegradable container of claim 10 wherein a base of the outer cylindrical cover abuts an upper part of the dome portion, the bottom of the dome portion further including an inner rim containing welding flash.

12. The biodegradable container of claim 10 wherein at least one rib of the set of exterior ribs defines one or more barbs for retaining the paper sleeve in place.

13. A biodegradable container, comprising:
    a cylindrical polymeric body element having a body defining an inner cylindrical surface and on outer cylindrical surface wherein a set of exterior ribs are defined on the outer cylindrical surface;
    a polymeric top dome element including a dome portion and a cylindrical neck defining an inner surface and an outer surface, the dome portion including a bottom joined to the cylindrical polymeric body element;
    wherein a bottom of the dome portion includes a sealing rim abutting an upper portion of the outer cylindrical surface, the sealing rim being designed to prevent contaminates from entering an interior of the biodegradable container;
    wherein a top of the dome portion defines indentations configured to engage tooling for spin welding of the bottom of the dome portion to the cylindrical polymeric body element;
    a paper sleeve supported by the set of exterior ribs; and
    a polymeric cap defining an internal rim configured to be received by the inner surface of the cylindrical neck wherein the polymeric cap includes an outer cylindrical cover configured to extend over the outer surface of the cylindrical neck.

14. The biodegradable container of claim 13 wherein the outer surface of the cylindrical neck forms a uniform sealing face configured to be substantially flush with an interior surface of the outer cylindrical cover.

* * * * *